US012536959B2

(12) United States Patent
Lee et al.

(10) Patent No.: US 12,536,959 B2
(45) Date of Patent: Jan. 27, 2026

(54) PIXELS AND DISPLAY APPARATUS INCLUDING THE SAME

(71) Applicant: Samsung Display Co., LTD., Yongin-si (KR)

(72) Inventors: Jiyoung Lee, Yongin-si (KR); Sohae Kim, Yongin-si (KR); Jisong Chae, Yongin-si (KR); Sanggu Lee, Yongin-si (KR); Yongwoo Lee, Yongin-si (KR); Hyunguk Cho, Yongin-si (KR); Hyunyoung Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/776,356

(22) Filed: Jul. 18, 2024

(65) Prior Publication Data

US 2025/0087156 A1 Mar. 13, 2025

(30) Foreign Application Priority Data

Sep. 7, 2023 (KR) ........................ 10-2023-0119274

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 7,561,124 | B2 | 7/2009 | Kwak et al. | |
| 9,111,481 | B2 * | 8/2015 | Ono | G09G 5/10 |
| 9,524,673 | B2 * | 12/2016 | Kimura | G09G 3/3233 |
| 10,192,486 | B2 * | 1/2019 | He | G09G 3/3258 |
| 11,694,630 | B2 | 7/2023 | Jin et al. | |
| 11,823,627 | B2 | 11/2023 | Park et al. | |
| 12,243,485 | B2 * | 3/2025 | Kim | G09G 3/3241 |
| 2006/0170634 | A1 * | 8/2006 | Kwak | H10K 59/80518 345/92 |
| 2006/0221662 | A1 * | 10/2006 | Park | G09G 3/3233 365/145 |

(Continued)

FOREIGN PATENT DOCUMENTS

| | | | |
|---|---|---|---|
| KR | 100686334 | B1 | 2/2007 |
| KR | 20230001881 | A | 1/2023 |

(Continued)

*Primary Examiner* — Dorothy Harris
(74) *Attorney, Agent, or Firm* — CANTOR COLBURN LLP

(57) ABSTRACT

A pixel includes a first transistor configured to output, to an output terminal, a driving current corresponding to an amplitude of a data voltage, a second transistor connected between a gate of the first transistor and a data line, a third transistor connected between the first transistor and the second transistor, a fourth transistor connected between the first transistor and a driving voltage line, a light-emitting diode connected to the first transistor, a first capacitor connected between the gate of the first transistor and the third transistor, and a second capacitor connected between the third transistor and the driving voltage line.

19 Claims, 22 Drawing Sheets

(56) References Cited

U.S. PATENT DOCUMENTS

| | | | | |
|---|---|---|---|---|
| 2008/0291182 | A1* | 11/2008 | Yamashita | G09G 3/3233 345/204 |
| 2010/0079419 | A1* | 4/2010 | Shibusawa | H10K 59/126 345/204 |
| 2011/0227903 | A1* | 9/2011 | Choi | G09G 3/3233 345/212 |
| 2012/0019498 | A1* | 1/2012 | Jeong | G09G 3/3233 345/76 |
| 2012/0169799 | A1* | 7/2012 | Ono | G09G 3/3233 345/77 |
| 2013/0113779 | A1* | 5/2013 | Yoon | G09G 3/3233 345/82 |
| 2013/0335391 | A1* | 12/2013 | Kim | G09G 3/3291 345/76 |
| 2017/0200414 | A1* | 7/2017 | Li | G09G 3/3266 |
| 2018/0190197 | A1* | 7/2018 | Chang | H10K 59/1216 |

FOREIGN PATENT DOCUMENTS

| | | | |
|---|---|---|---|
| KR | 20230022372 | A | 2/2023 |
| KR | 20230043298 | A | 3/2023 |

* cited by examiner

PIXELS AND DISPLAY APPARATUS INCLUDING THE SAME

This application claims priority to Korean Patent Application No. 10-2023-0119274, filed on Sep. 7, 2023, and all the benefits accruing therefrom under 35 U.S.C. § 119, the content of which in its entirety is herein incorporated by reference.

BACKGROUND

1. Field

The invention relates to a pixel in a display and, more particularly to a pixel for internal compensation of a threshold voltage in a display and a display apparatus including the same.

2. Description of the Related Art

A display apparatus includes pixels, and each pixel may include a capacitor, a light-emitting device, and a transistor that drives the light-emitting device.

SUMMARY

One or more embodiments include a display apparatus having improved image quality by compensating for a threshold voltage of a driving transistor constituting a pixel circuit.

Embodiments of the invention will be set forth in part in the description which follows and, in part, will be apparent from the description, or may be learned by practice of the presented embodiments of the invention.

According to one or more embodiments, a pixel includes a first transistor configured to output, to an output terminal, a driving current corresponding to an amplitude of a data voltage, a second transistor connected between a gate of the first transistor and a data line, a third transistor connected between the first transistor and the second transistor, a fourth transistor connected between the first transistor and a driving voltage line, a light-emitting diode connected to the first transistor, a first capacitor connected between the gate of the first transistor and the third transistor, and a second capacitor connected between the third transistor and the driving voltage line.

In an embodiment, the pixel may further include a fifth transistor connected between a first electrode of the light-emitting diode and an initialization voltage line.

In an embodiment, the pixel may be configured to operate in a non-emission period and an emission period during a frame period, and the non-emission period may include a write period in which the third transistor, the fourth transistor, and the fifth transistor are turned off, and the second transistor is turned on, so that a data signal is applied from the data line to a gate of the first transistor, and before the write period, a first period in which the second transistor, the third transistor, and the fifth transistor are turned on and the fourth transistor is turned off, so that an initialization voltage is applied from the data line to the gate of the first transistor.

In an embodiment, in the emission period, the second transistor, the third transistor, and the fifth transistor may be turned off, and the fourth transistor may be turned on.

In an embodiment, the emission period may include, after the write period, a second period in which the third transistor is turned on.

In an embodiment, the pixel may further include a third capacitor connected between the driving voltage line and a first node, wherein the first node may include a node to which the first transistor and the third transistor are connected.

In an embodiment, the pixel may further include a fourth capacitor connected between a gate of the second transistor and a second node, wherein the second node may include a node to which the first capacitor and the second capacitor are connected.

In an embodiment, a voltage supplied to the initialization voltage line may be supplied to a second electrode of the light-emitting diode.

In an embodiment, a voltage supplied to the initialization voltage line may be different from the voltage supplied to the second electrode of the light-emitting diode.

In an embodiment, the non-emission period may further include, after the write period and before the second period, a third period in which the second transistor, the third transistor, and the fourth transistor are turned off.

In an embodiment, in the third period, a timing at which the first gate signal transitions from a gate-off voltage to a gate-on voltage may be earlier than a timing at which the second gate signal transitions from a gate-on voltage to a gate-off voltage.

In an embodiment, the third period may be shorter than the first period and the second period.

According to one or more embodiments, a display apparatus includes a plurality of pixels, a gate driving circuit configured to supply a gate signal to the plurality of pixels, and a data driving circuit configured to supply a data signal to the plurality of pixels, wherein each of the plurality of pixels includes a first transistor configured to output, to an output terminal, a driving current corresponding to an amplitude of a data voltage, a second transistor which includes a gate connected to a first gate line and which is connected between a gate of the first transistor and a data line, a third transistor which includes a gate connected to a second gate line and which is connected between the first transistor and the second transistor, a fourth transistor which includes a gate connected to a third gate line and which is connected between the first transistor and a driving voltage line, a light-emitting diode connected to the first transistor, a first capacitor connected between the gate of the first transistor and the third transistor, and a second capacitor connected between the third transistor and the driving voltage line.

In an embodiment, each of the plurality of pixels may further include a fifth transistor which includes a gate connected to the first gate line and which is connected between a first electrode of the light-emitting diode and an initialization voltage line.

In an embodiment, in a first period of a frame period, the gate driving circuit may be configured to supply, to the first gate line, a first gate signal that turns on the second transistor and the fifth transistor, and supply, to the second gate line, a second gate signal that turns on the third transistor, and in a write period of the frame period, the gate driving circuit may be configured to supply, to the first gate line, the first gate signal that turns on the second transistor, and the data driving circuit may be configured to supply an initialization voltage to the data line in the first period, and supply a data signal to the data line in the write period.

In an embodiment, the gate driving circuit may be configured to supply, to the third gate line, a third gate signal that turns on the fourth transistor, in an emission period of the frame period.

In an embodiment, the emission period may include, after the write period, a second period in which the third transistor is turned on, wherein the gate driving circuit may be configured to supply, to the second gate line, a second gate signal that turns on the third transistor in the second period.

In an embodiment, each of the plurality of pixels may further include a third capacitor connected between the driving voltage line and the first node, wherein the first node may include a node to which the first transistor and the third transistor are connected.

In an embodiment, each of the plurality of pixels may further include a fourth capacitor connected between the first gate line and a second node, wherein the second node may include a node to which the first capacitor and the second capacitor are connected.

In an embodiment, the frame period may further include, after the write period and before the second period, a third period in which the second transistor, the third transistor, and the fourth transistor are turned off.

BRIEF DESCRIPTION OF THE DRAWINGS

The above and other aspects, features, and advantages of embodiments of the invention will be more apparent from the following description taken in conjunction with the accompanying drawings, in which.

DETAILED DESCRIPTION

Figure 1:
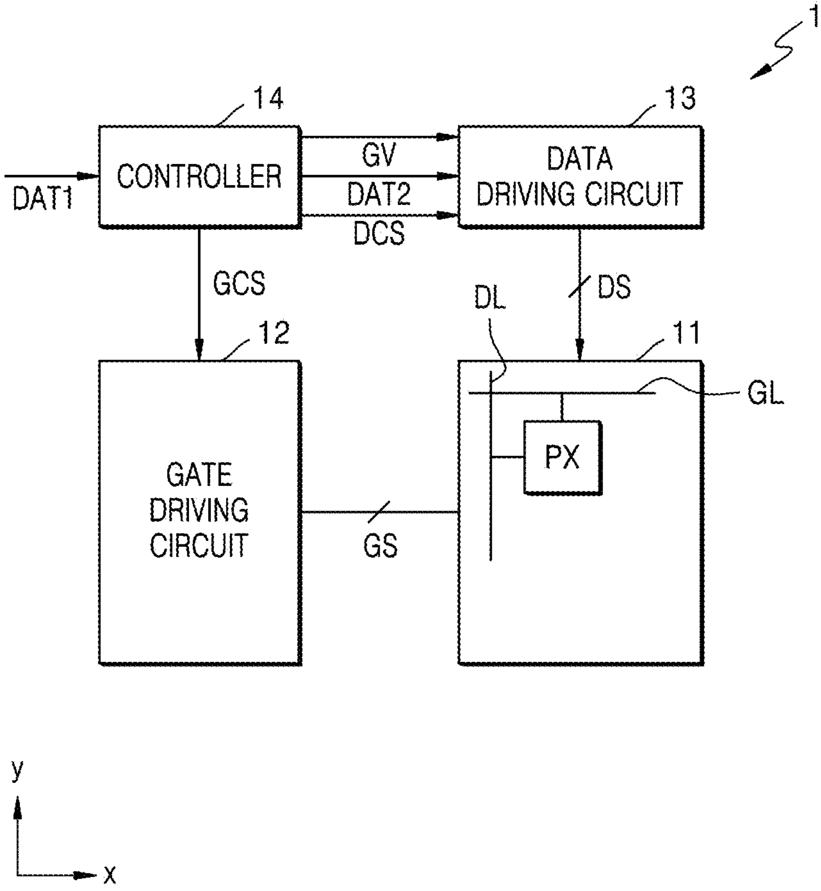
FIG. 1 is a diagram schematically illustrating a display apparatus, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the invention. As used herein, the term "and/or" includes any and all combinations of one or more of the associated listed items. Throughout the disclosure, the expression "at least one of a, b and c" indicates only a, only b, only c, both a and b, both a and c, both b and c, all of a, b, and c, or variations thereof.

As the invention allows for various changes and numerous embodiments, particular embodiments will be illustrated in the drawings and described in detail in the written description. The effects and features of the invention, and ways to achieve them will become apparent by referring to embodiments that will be described later in detail with reference to the drawings. However, the invention is not limited to the following embodiments but may be embodied in various forms.

It will be understood that although the terms "first," "second," etc. may be used herein to describe various elements, these elements should not be limited by these terms. These terms are only used to distinguish one element from another. Thus, "a first element," "component," "region," "layer" or "section" discussed below could be termed a second element, component, region, layer or section without departing from the teachings herein.

Singular expressions, unless defined otherwise in contexts, include plural expressions.

In the following embodiments, terms such as "include" or "have" mean that the features or elements described in the specification exist, and do not exclude in advance the possibility of adding one or more other features or elements.

Herein, "A and/or B" may indicate only A, only B, or both A and B. Also, "at least one of A and B" herein may indicate only A, only B, or both A and B.

In the following embodiments, when X and Y are connected to each other, this may include a case where X and Y are electrically connected to each other, a case where X and Y are functionally connected to each other, and a case where X and Y are directly connected to each other. Here, X and Y may be objects (e.g., apparatuses, elements, circuits, wires, electrodes, terminals, conductive films, layers, etc.). Thus, the connection relationship is not limited to a predetermined connection relationship, for example, the connection relationship illustrated in the drawings or the detailed description, and may also include connection relationships other than those illustrated in the drawings or the detailed description.

When X and Y are electrically connected to each other, for example, at least one element that enables electrical connection between X and Y (e.g., a switch, a transistor, a capacitive element, an inductor, a resistive element, a diode) may be connected between X and Y.

In the following embodiments, "ON" used in connection with the state of an element may refer to an activated state of the element, and "OFF" may refer to a deactivated state of the element. "On," as used in connection with a signal received by an element, may refer to a signal that activates the element, and "off" may refer to a signal that deactivates the element. An element may be activated by a high-level voltage or a low-level voltage. For example, a P-channel transistor (P-type transistor) is activated by a low-level voltage, and an N-channel transistor (N-type transistor) is activated by a high-level voltage. Thus, it should be understood that the "on" voltages for the P-type transistor and the N-type transistor are opposite (low vs. high) voltage levels.

In the following embodiments, an x-direction, a y-direction, and a z-direction are not limited to directions along the three axes of the Cartesian coordinate system, and may be interpreted in a broad sense including these. For example, the x-direction, y-direction, and z-direction may be orthogonal to each other, but may also refer to different directions that are not orthogonal to each other.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that the terms "include," "comprise," and "have" as used herein specify the presence of stated features or elements but do not preclude the addition of one or more other features or elements.

It will be further understood that, when a layer, region, or element is referred to as being on another layer, region, or element, it may be directly or indirectly on the other layer, region, or element. That is, for example, intervening layers, regions, or elements may be present.

Sizes of elements in the drawings may be exaggerated or reduced for convenience of explanation. For example, since sizes and thicknesses of elements in the drawings are arbitrarily illustrated for convenience of explanation, the following embodiments are not limited thereto.

Hereinafter, embodiments of the invention will be described in detail with reference to the accompanying drawings, and in the description with reference to the drawings, like reference numerals refer to like elements and redundant descriptions thereof will be omitted.

FIG. 1 is a diagram schematically illustrating a display apparatus, according to an embodiment.

In an embodiment and referring to FIG. 1, a display apparatus 1 may include a pixel unit 11, a gate driving circuit 12, a data driving circuit 13, and a controller 14.

In an embodiment, a plurality of pixels PX and signal lines through which electrical signals may be applied to the plurality of pixels PX may be arranged in the pixel unit 11. The pixel unit 11 may be a display area where an image is displayed.

In an embodiment, the plurality of pixels PX may be repeatedly arranged in a first direction (an x-direction, a row direction) and a second direction (a y-direction, a column direction). The plurality of pixels PX may be arranged in various forms such as a stripe arrangement, a pentile arrangement, or a mosaic arrangement to realize an image. Each of the plurality of pixels PX may include a light-emitting diode as a display element, where the light-emitting diode may be connected to a pixel circuit. The pixel circuit may include a plurality of transistors and at least one capacitor. A pixel circuit, according to an embodiment, is described later by referring to FIG. 2.

In an embodiment, signal lines through which electrical signals may be applied to the plurality of pixels PX may include a plurality of gate lines GL extending in the first direction and a plurality of data lines DL extending in the second direction. The plurality of gate lines GL may be arranged apart from each other in the second direction and configured to transmit a gate signal GS to the pixels PX. The plurality of data lines DL may be arranged apart from each other in the first direction and configured to transmit a data signal DS to the pixels PX. Each of the plurality of pixels PX may be connected to at least one corresponding gate line among the plurality of gate lines GL and a corresponding data line among the plurality of data lines DL. In FIG. 1, for convenience of illustration, one gate line connected to the pixel PX is illustrated. However, each pixel PX may be connected to a plurality of gate lines depending on the number of transistors constituting the pixel circuit.

In an embodiment, the gate driving circuit 12 may be connected to the plurality of gate lines GL and may generate a gate signal in response to a gate control signal GCS from the controller 14, and sequentially supply the gate signal to the gate lines GL. The gate line GL may be connected to a gate of a transistor included in the pixel PX. The gate signal may be a gate control signal that controls the turn-on and turn-off of a transistor having a gate connected to the gate line GL. The gate signal may be a square wave signal including an on voltage at which a transistor may be turned on and an off voltage at which a transistor may be turned off.

In an embodiment, the data driving circuit 13 may be connected to the plurality of data lines DL and may supply the data signal DS to the data lines DL in response to a control signal DCS from the controller 14. The data driving circuit 13 may receive gamma voltages GV respectively corresponding to gray levels and image data DAT2 from the controller 14, and generate the data signal DS corresponding to the gray levels.

In an embodiment, the controller 14 may generate a gate control signal GCS and a data control signal DCS based on signals input from the outside. The controller 14 may supply the gate control signal GCS to the gate driving circuit 12 and the data control signal DCS to the data driving circuit 13.

In an embodiment, the controller 14 may generate the image data DAT2 by converting input image data DAT1 input from an external source (e.g., a graphics processor). For example, the controller 14 may convert input image data DAT1 in RGB format into image data DAT2 in a format that matches the pixel arrangement of the pixel unit 11. The controller 14 may include a storage unit in which gamma voltages corresponding to gray levels and correction data are written.

In an embodiment and referring to FIG. 1, the data driving circuit 13 and the controller 14 that are implemented independently of each other are illustrated, but the invention is not limited thereto. For example, the data driving circuit 13 and the controller 14 may be implemented as a single integrated circuit (IC) (e.g., driving integrated circuit).

In an embodiment, the display apparatus 1 may be a display apparatus such as an organic light-emitting display apparatus, an inorganic light-emitting display apparatus (or an inorganic EL display apparatus), or a quantum dot light-emitting display apparatus.

In an embodiment, the display apparatus 1 may be used as a display screen of not only a mobile phone, a smart phone, a tablet personal computer (PC), a mobile communication terminal, an electronic notebook, an e-book, a portable multimedia player (PMP), a navigation device, a ultra mobile personal computer (UMPC), but also that of various products such as televisions, laptops, monitors, billboards, and the Internet of Things (IOT). In addition, the display apparatus 1, according to an embodiment, may be used in a wearable device such as a smart watch, a watch phone, a glasses-type display, and a head-mounted display (HMD). In addition, the display apparatus 1, according to an embodiment, may be used as a panel of a vehicle, a center information display (CID) placed on the center fascia or a dashboard of a vehicle, a room mirror display which replaces a side mirror of a vehicle, or a display placed on the back of the front sear as entertainment for the backseat of a vehicle.

Figure 2:
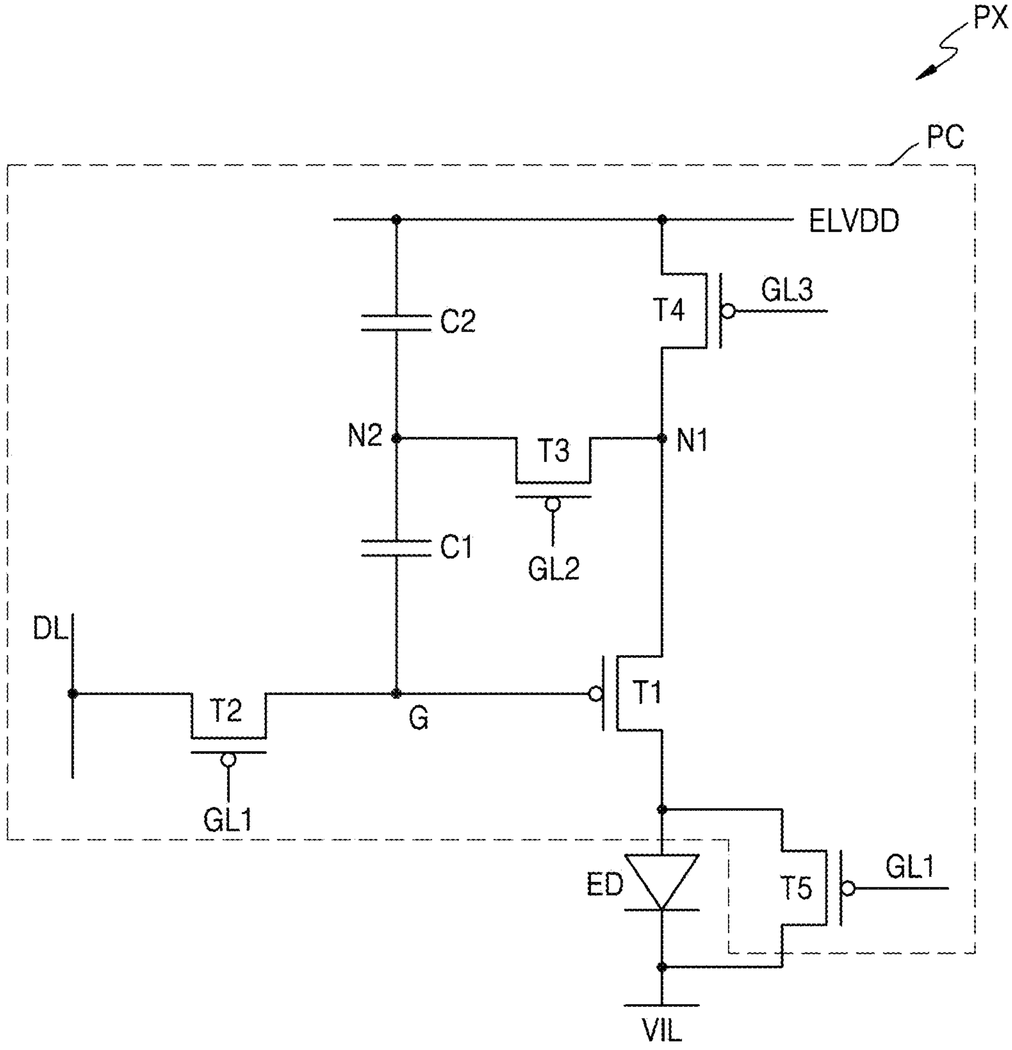
FIG. 2 is a schematic diagram illustrating an equivalent circuit diagram of a pixel included in a display apparatus, according to an embodiment.
Figure 3:
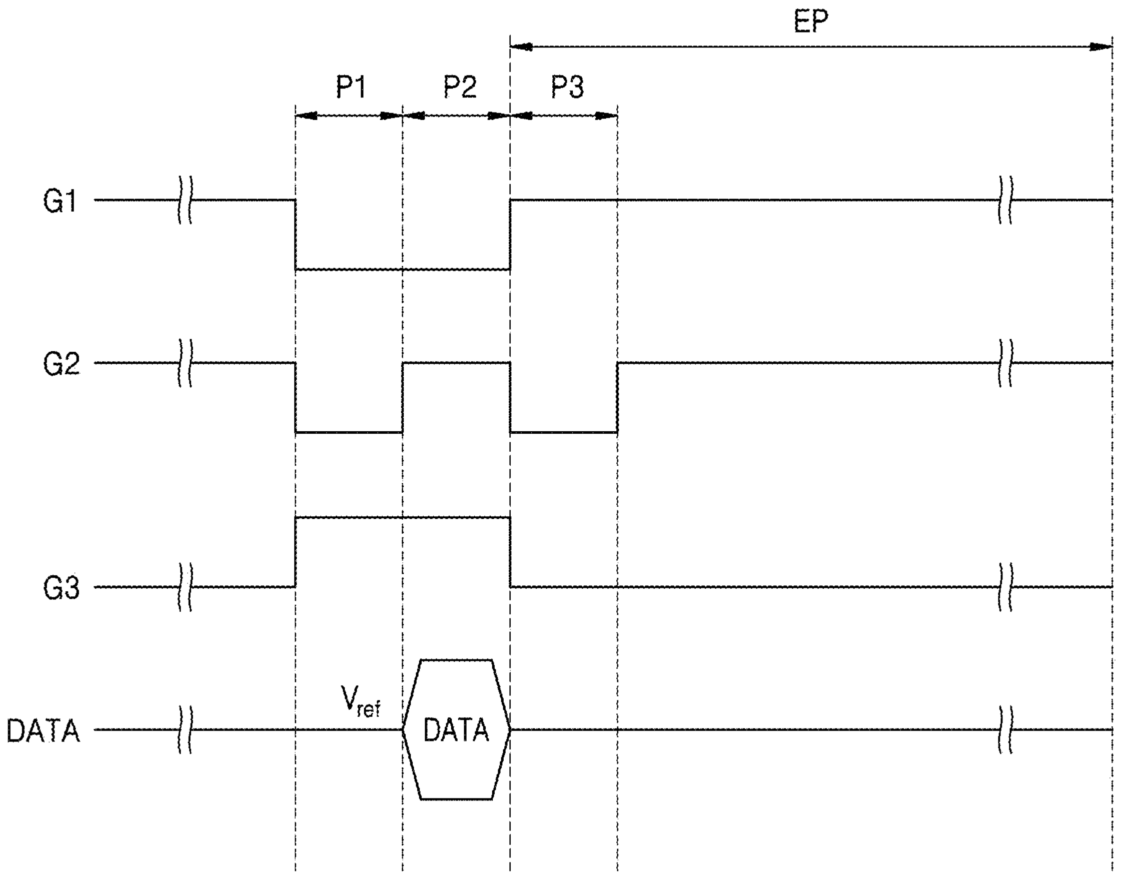
FIG. 3 is a timing diagram illustrating a driving signal of a pixel circuit, according to an embodiment.

FIG. 2 is an equivalent circuit diagram of a pixel included in a display apparatus, according to an embodiment. FIG. 3 is a timing diagram illustrating signals for describing an operation of the pixel illustrated in FIG. 2, according to an embodiment. A pixel PX illustrated in FIG. 2 may be an embodiment of the pixel PX illustrated in FIG. 1.

In an embodiment and referring to FIG. 2, the pixel PX may include a light-emitting diode ED as a display element (light-emitting device) and a pixel circuit PC connected to the light-emitting diode ED. In an embodiment, the light-emitting diode ED may be an organic light-emitting diode OLED. The pixel PX may emit, for example, red, green, blue, or white light through the light-emitting diode ED. The pixel circuit PC may include first to fifth transistors T1 to T5, respectively, and first and second capacitors C1 and C2, respectively. The first transistor T1 may include a driving transistor configured to output a driving current corresponding to a data signal, and the second to fifth transistors T2 to T5, respectively, may include switching transistors configured to transmit signals. A first terminal (first electrode) of each of the first to fifth transistors T1 to T5, respectively, may be a source or a drain, and a second terminal (second electrode) thereof may be a terminal different from the first terminal. For example, if the first terminal is a source, the second terminal may be a drain. A node to which the first transistor T1 and the third transistor T3 are connected may be defined as a first node N1, and a node to which the first capacitor C1 and the second capacitor C2 are connected may be defined as a second node N2. Additionally, a node connected to a gate of the first transistor T1 may be defined as a third node G.

In an embodiment, as illustrated in FIG. 2, a plurality of transistors included in the pixel circuit PC may be P-type silicon thin-film transistors. In another embodiment, the plurality of transistors included in the pixel circuit PC may be N-type oxide thin-film transistors. In another embodiment, some of the plurality of transistors included in the pixel circuit PC may be N-type oxide thin-film transistors, and some others may be P-type silicon thin-film transistors.

In an embodiment, an oxide thin-film transistor may be a low temperature polycrystalline oxide (LTPO) thin-film transistor in which an active pattern (semiconductor layer) includes oxide. However, this is an example, and N-type transistors are not limited thereto. For example, an active pattern (semiconductor layer) included in an N-type transistor may include an inorganic semiconductor (e.g., amorphous silicon, polysilicon) or an organic semiconductor. A silicon thin-film transistor may be a Low Temperature Poly-Silicon (LTPS) thin-film transistor in which an active pattern (semiconductor layer) includes amorphous silicon, poly silicon, etc.

In an embodiment, the pixel PX may be connected to a first gate line GL1 configured to transmit a first gate signal, a second gate line GL2 configured to transmit a second gate signal, and a third gate line GL3 configured to transmit a third gate signal. In an embodiment, the third gate signal may be referred to as an emission control signal and the third gate line GL3 may be referred to as an emission control line. Additionally, the pixel PX may be connected to a driving voltage line ELVDD configured to transmit a first driving voltage VDD, an initialization voltage line VIL configured to transmit an initialization voltage, and a data line DL configured to transmit a data signal. In an embodiment, the data line DL may be connected to a reference voltage line through which a reference voltage is transmitted, to thereby transmit a reference voltage.

In an embodiment, a voltage level of the first driving voltage VDD supplied from the driving voltage line ELVDD may be higher than a voltage level of a second driving voltage VSS. A voltage level of the reference voltage may be lower than a voltage level of the first driving voltage VDD.

In an embodiment, the first transistor T1 may be connected between the fourth transistor T4 and the light-emitting diode ED. The first transistor T1 may include a gate, a first terminal, and a second terminal connected to the first node N1. The first terminal of the first transistor T1 may be connected to the driving voltage line ELVDD via the fourth transistor T4, and the second terminal of the first transistor T1 may be connected to a pixel electrode of the light-emitting diode ED. The first transistor T1 may receive a data signal through the data line DL according to a switching operation of the second transistor T2 and control the amount of driving current flowing to the light-emitting diode ED.

In an embodiment, the second transistor T2 may be connected between the gate of the first transistor T1 and the data line DL. The second transistor T2 may include a gate connected to the first gate line GL1, a first terminal connected to the data line DL, and a second terminal connected to the third node G. The second transistor T2 may be turned on by the first gate signal transmitted to the first gate line GL1 and electrically connect the data line DL to the third node G, and is configured to transmit the data signal transmitted to the data line DL, to the third node G connected to the gate of the first transistor T1. In an embodiment, when the data line DL is connected to the reference voltage line, the second transistor T2 may be turned on by the first gate signal to transmit the reference voltage to the third node G connected to the gate of the first transistor T1.

In an embodiment, the third transistor T3 may be connected between the first terminal of the first transistor T1 and the first capacitor C1. The third transistor T3 may include a gate connected to the second gate line GL2, a first terminal connected to the first node N1, and a second terminal connected to the first capacitor C1. In an embodiment, the third transistor T3 may be turned on by a second gate signal transmitted to the second gate line GL2 to connect the first node N1 to the second node N2.

In an embodiment, the fourth transistor T4 may be connected between the driving voltage line ELVDD and the first terminal of the first transistor T1. The fourth transistor T4 may include a gate connected to the third control line GL3, a first terminal connected to the driving voltage line ELVDD, and a second terminal connected to the first node N1. The fourth transistor T4 may be turned on or off according to a control signal transmitted to the third gate line GL3.

In an embodiment, the fifth transistor T5 may be connected between the second terminal of the first transistor T1 and the initialization voltage line VIL configured to supply an initialization voltage. In an embodiment, the initialization voltage line VIL may receive the second driving voltage VSS as an initialization voltage. The fifth transistor T5 may include a gate connected to the first gate line GL1, a first terminal connected to the second terminal of the first transistor T1, and a second terminal connected to the initialization voltage line VIL. The fifth transistor T5 may be turned on or off by the first gate signal transmitted to the first gate line GL1.

In an embodiment, the first capacitor C1 may be connected between the second terminal of the third transistor T3 and the gate of the first transistor T1. A first electrode of the first capacitor C1 may be connected to the third node G, and a second electrode thereof may be connected to the second node N2. The first capacitor C1 is a storage capacitor and may store a voltage corresponding to a threshold voltage of the first transistor T1 and a voltage corresponding to a data signal.

In an embodiment, the second capacitor C2 may be connected between the driving voltage line ELVDD and the third transistor T3. A first electrode of the second capacitor C2 may be connected to the driving voltage line ELVDD, and a second electrode thereof may be connected to the second node N2. A capacitance of the first capacitor C1 may be greater than a capacitance of the second capacitor C2.

In an embodiment, the light-emitting diode ED may be connected to the first transistor T1. The light-emitting diode ED may include a pixel electrode (anode) connected to the second terminal of the first transistor T1 and an opposite electrode (cathode) facing the pixel electrode, where the opposite electrode may receive the second driving voltage VSS. The opposite electrode may be a common electrode common to a plurality of pixels PX.

In an embodiment, a pixel PX may display an image for each frame period. Referring to FIG. 3, one frame period may include a non-emission period in which the pixel PX does not emit light and an emission period EP in which the pixel PX emits light. The non-emission period may include a first period P1 and a second period P2, and the emission period EP may include a third period P3.

In an embodiment, each of the first gate signal G1, the second gate signal G2, and the third gate signal G3 may have a high level voltage in some periods and a low level voltage in some periods. Here, a high level voltage of the first gate signal G1, the second gate signal G2, and the third gate signal G3 may be a gate-off voltage that turns off a transistor, and a low level voltage thereof may be a gate-on voltage that turns on a transistor.

Figure 4A:
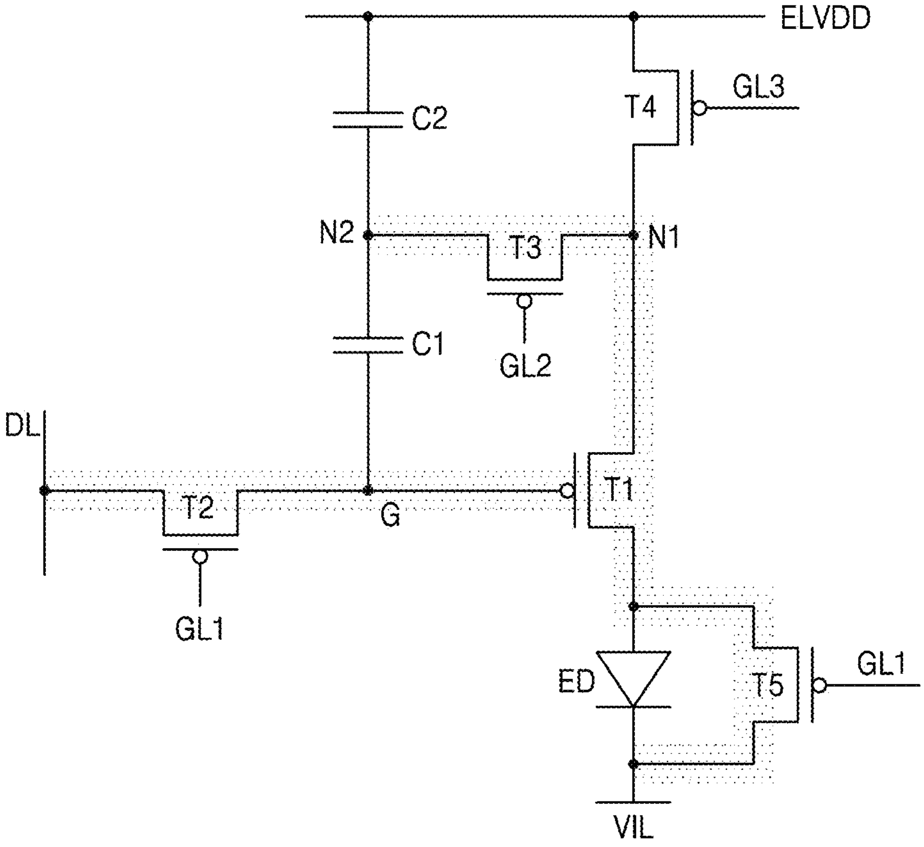
FIG. 4A is a circuit diagram for describing driving in a first period of the circuit illustrated in FIG. 2, according to an embodiment.
Figure 4B:
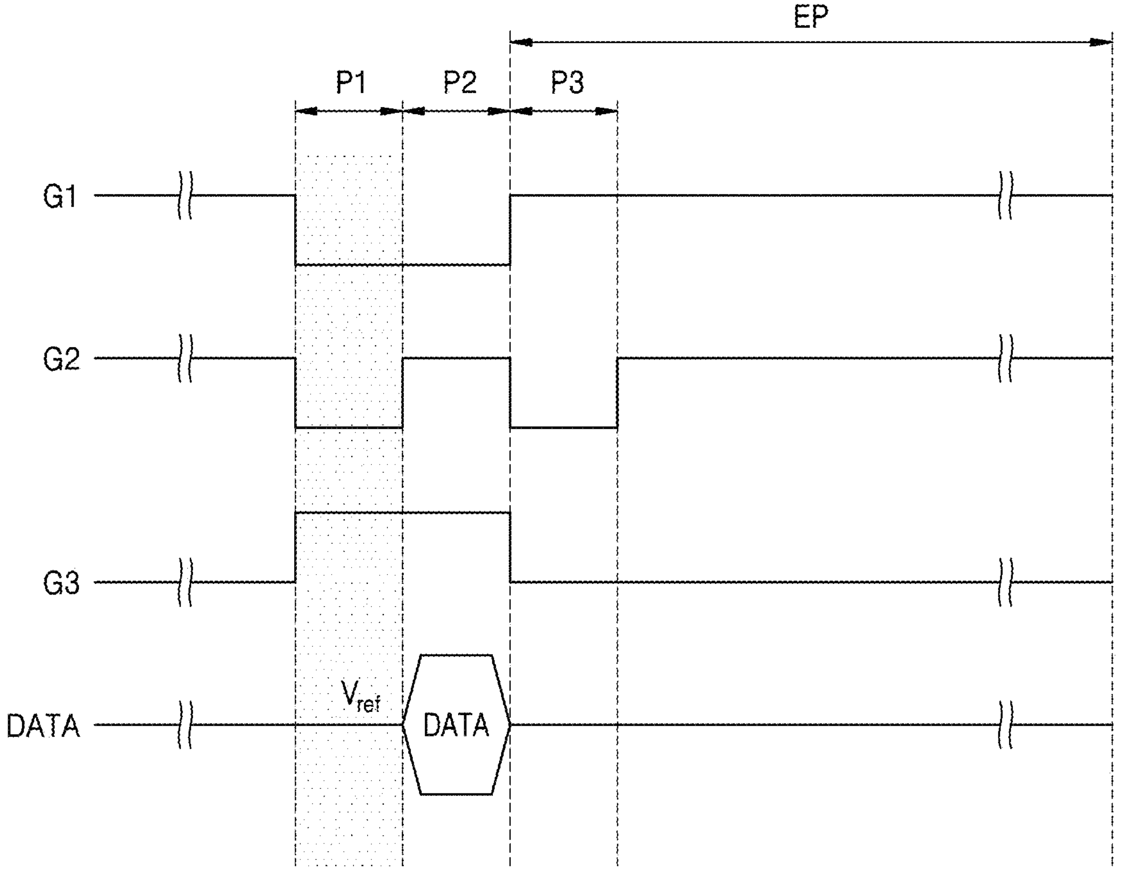
FIG. 4B is a timing diagram for describing driving in a first period of the circuit illustrated in FIG. 2, according to an embodiment.

FIGS. 4A and 4B are diagrams for describing driving in a first period of a circuit illustrated in FIG. 2, according to an embodiment.

In an embodiment, the first period P1 may be an initialization period in which the gate of the first transistor T1 and the pixel electrode of the light-emitting diode ED are initialized and a compensation period in which the threshold voltage of the first transistor T1 is compensated for. The first period P1 may be approximately one horizontal period 1H.

In an embodiment and referring to FIGS. 4A and 4B, in the first period P1, the first gate signal G1 of a gate-on voltage may be supplied to the first gate line GL1, and the second gate signal G2 of a gate-on voltage may be supplied to the second gate line GL2. The third gate signal G3 of a gate-off voltage may be supplied to the third gate line GL3. A reference voltage Vref may be supplied to the data line DL. The reference voltage Vref may be an initialization voltage that initializes the gate of the first transistor T1.

In an embodiment, the second transistor T2 and the fifth transistor T5 may be turned on by the first gate signal G1, and the third transistor T3 may be turned on by the second gate signal G2. The reference voltage Vref is transmitted to the third node G, that is, the gate of the first transistor T1, by the second transistor T2 that is turned on, and the second driving voltage VSS is transmitted to the pixel electrode of the light-emitting diode ED by the fifth transistor T5 that is turned on, and the first transistor T1 may be turned on, accordingly. When a voltage of the first terminal of the first transistor T1 and the second node N2 reaches a difference (Vref-Vth) between the reference voltage Vref and the threshold voltage Vth of the first transistor T1, the first transistor T1 may be turned off. The first capacitor C1 may be charged with a voltage corresponding to the threshold voltage Vth of the first transistor T1. In the first period P1, a voltage of the third node G may be initialized to the reference voltage Vref, the voltage of the second node N2 may be initialized to (Vref-Vth), and the pixel electrode of the light-emitting diode ED may be initialized to the second driving voltage VSS.

Figure 5A:
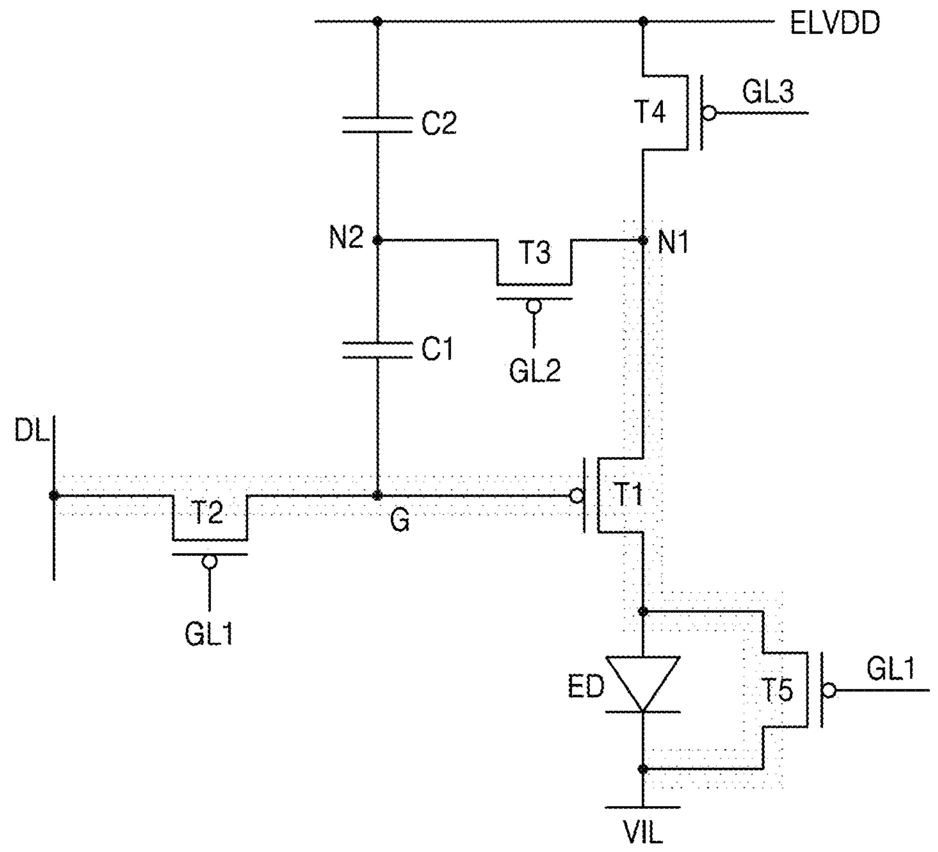
FIG. 5A is a circuit diagram for describing driving in a write period of the circuit illustrated in FIG. 2, according to an embodiment.
Figure 5B:
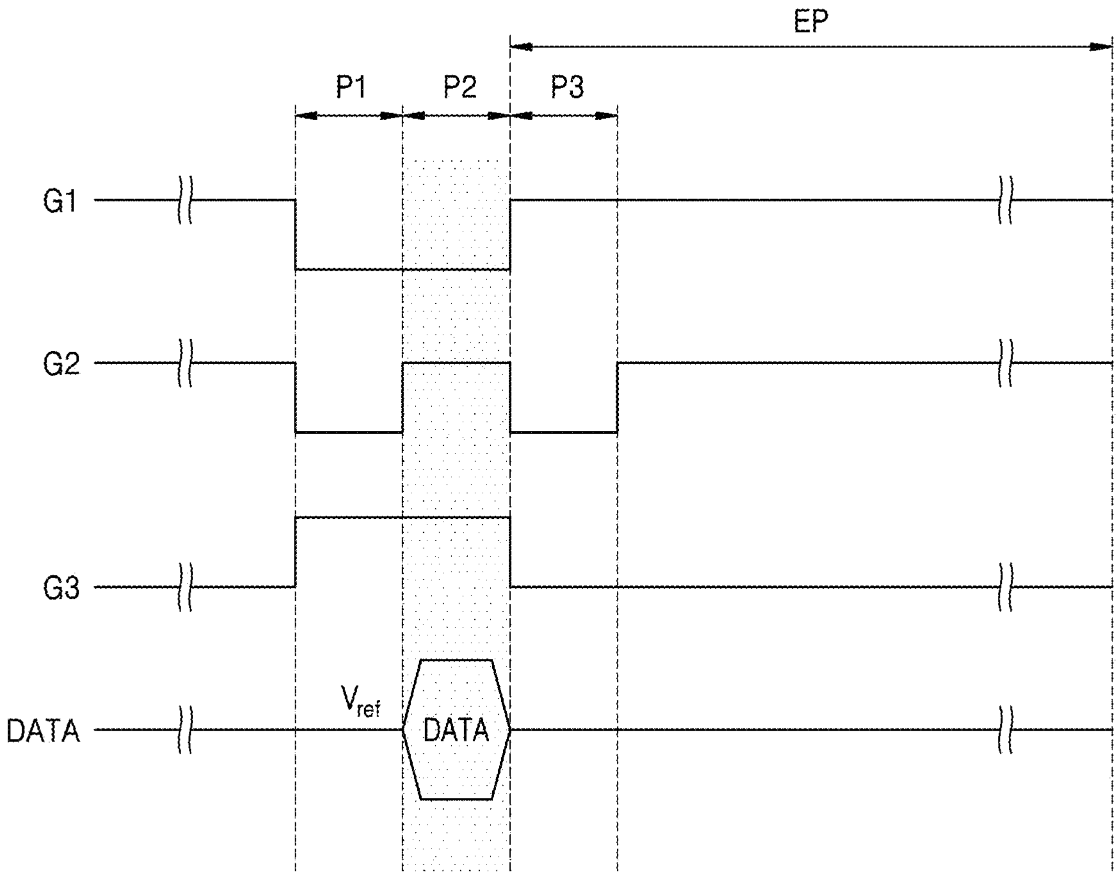
FIG. 5B is a timing diagram for describing driving in a write period of the circuit illustrated in FIG. 2, according to an embodiment.

FIGS. 5A and 5B are diagrams for describing driving in a second period of the circuit illustrated in FIG. 2, according to an embodiment.

In an embodiment, the second period P2 may be a write period in which the data signal DATA is transmitted to the gate of the first transistor T1. The second period P2 may be approximately one horizontal period 1H.

In an embodiment and referring to FIGS. 5A and 5B, in the second period P2, the first gate signal G1 of a gate-on voltage may be supplied to the first gate line GL1, and the second gate signal G2 of a gate-off voltage may be supplied to the second gate line GL2, and a third gate signal G3 of a gate-off voltage may be supplied to the third gate line GL3. A data signal DATA may be supplied to the data line DL.

In an embodiment, the second transistor T2 and the fifth transistor T5 may be turned on by the first gate signal G1. Here, the third transistor T3 and the fourth transistor T4 may be turned off by the second gate signal G2 and the third gate signal G3 of a gate-off voltage. The second transistor T2 may be configured to transmit a data voltage Vdata corresponding to the data signal DATA from the data line DL, to the third node G, that is, the gate of the first transistor T1. Accordingly, the voltage of the third node G may be changed from the reference voltage Vref to the data voltage Vdata. A voltage Vn2 of the second node N2 here may also be changed in response to a voltage change (Vdata−Vref) of the third node G. The voltage Vn2 of the second node N2 may be a voltage (Vref−Vth+α×(Vdata−Vref)) that is changed according to a capacitance ratio (α=C1/(C1+C2)) between the first capacitor C1 and the second capacitor C2. Accordingly, in the second period P2, the voltage Vn2 of the second node N2 is as shown in Equation (1) below, and the data voltage Vdata corresponding to the data signal DATA of the first transistor C1 may be charged in the first capacitor C1.

$$Vn2(P2) = Vref - Vth + \alpha \times (Vdata - Vref) = Vref - Vth + \{C1/(C1 + C2)\} \times (Vdata - Vref). \quad \text{Eq. (1)}$$

Figure 6A:
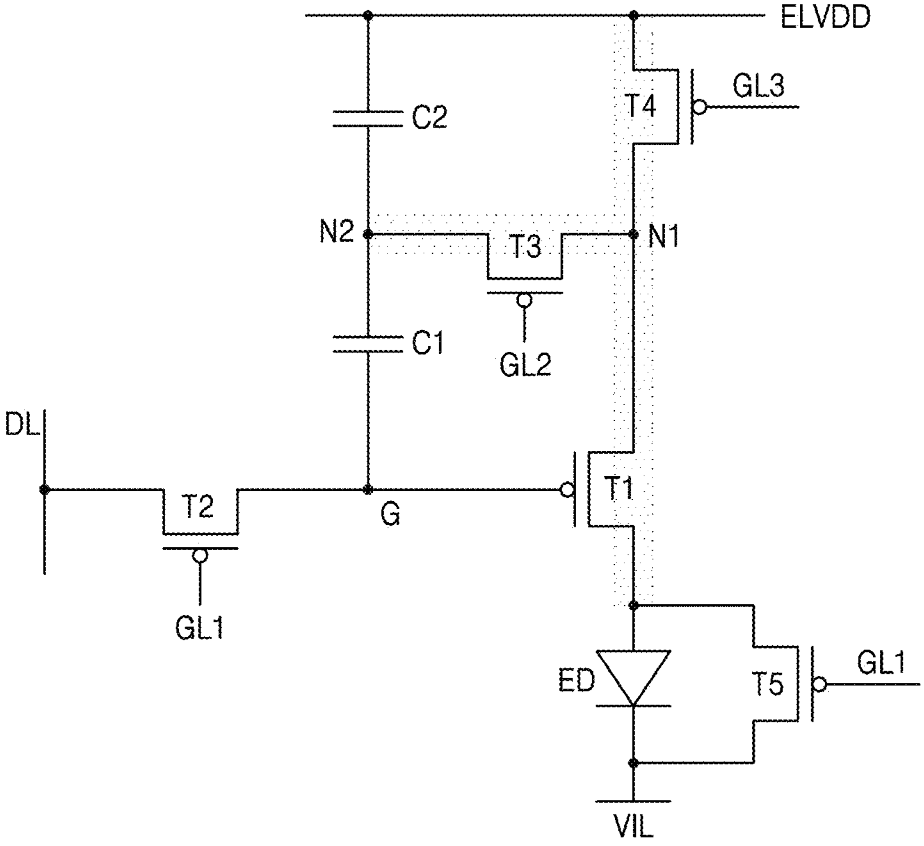
FIG. 6A is a circuit diagram for describing driving in a third period of the circuit illustrated in FIG. 2, according to an embodiment.
Figure 6B:
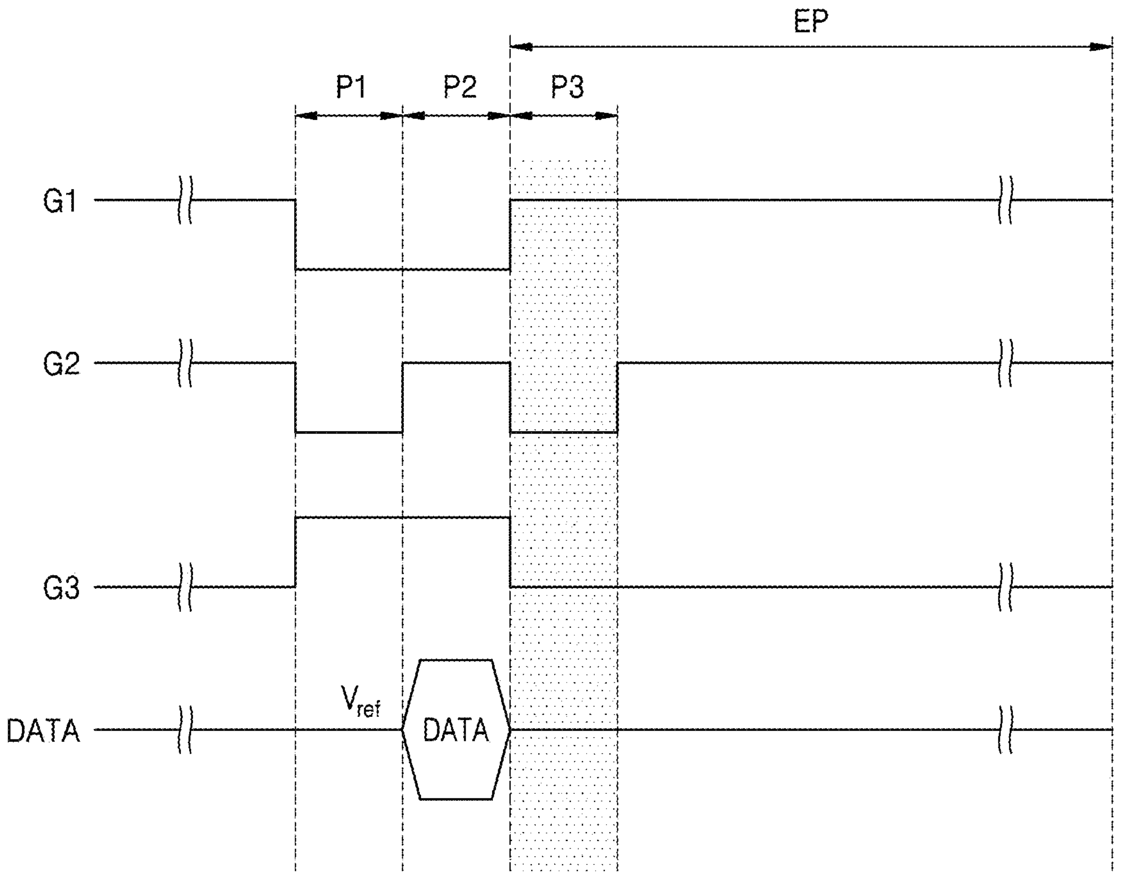
FIG. 6B is a timing diagram for describing driving in a third period of the circuit illustrated in FIG. 2, according to an embodiment.

FIGS. 6A and 6B are diagrams for describing driving in a third period of the circuit illustrated in FIG. 2, according to an embodiment.

In an embodiment, the emission period EP may be a period during which the light-emitting diode ED emits light. The emission period EP may include a third period P3. The third period P3 may be approximately one horizontal period 1H.

In an embodiment and referring to FIGS. 6A and 6B, in the third period P3, the second gate signal G2 of a gate-on voltage may be supplied to the second gate line GL2, and a third gate signal G3 of a gate-on voltage may be supplied to the third gate line GL3. The first gate signal G1 of a gate-off voltage may be supplied to the first gate line GL1. Here, the third gate signal G3 may be an emission control signal.

In an embodiment, the second transistor T2 and the fifth transistor T5 may be turned off by the first gate signal G1. The third transistor T3 and the fourth transistor T4 may be turned on by the second gate signal G2 and the third gate signal G3. Accordingly, the first driving voltage VDD may be supplied to the first terminal of the first transistor T1, thereby turning on the first transistor T1. As the third transistor T3 and the fourth transistor T4 are turned on, the voltage Vn2 of the second node N2 in the third period P3 may be changed to the first driving voltage VDD. A voltage Vg of the third node G is a value obtained by adding a voltage change (Vn2(P3)−Vn2(P2)) of the node N2 of the second period P2 and the third period P3 to a voltage Vg(P2) of the third node G in the second period P2. By substituting Equation (2) into Equation (3), Equation (4) as shown below may be obtained.

$$Vg = Vg(P2) + Vn2(P3) - Vn2(P2), \quad \text{Eq. (2)}$$

$$Vg = Vdata + VDD - Vn2(P2), \quad \text{Eq. (3)}$$

$$Vg = Vdata + VDD - Vref + Vth - [\{C1/(C1 + C2)\} \times Vdata + \{C1/(C1 + C2)\} \times Vref]. \quad \text{Eq. (4)}$$

In an embodiment, after the third period P3, the second gate signal G2 of a gate-off voltage is supplied to turn off the third transistor T3, and the voltage Vn2 of the second node N2 may be maintained as the first driving voltage VDD which is the voltage supplied in the third period P3.

In an embodiment, the first transistor T1 may be configured to output a driving current ($Id \propto (Vgs-Vth)^2$) having an amplitude corresponding to a voltage obtained by subtracting the threshold voltage Vth of the first transistor T1 from the voltage stored in the first capacitor C1, that is, a gate-source voltage of the first transistor T1 (a voltage difference between the gate of the first transistor T1 and the first node N1 (Vgs=Vdata−Vref+Vth−α×(Vdata−Vref)), and the light-emitting diode ED may emit light with a luminance corresponding to the amplitude of a driving current Id, which is unrelated to the threshold voltage Vth of the first transistor T1.

Figure 7:
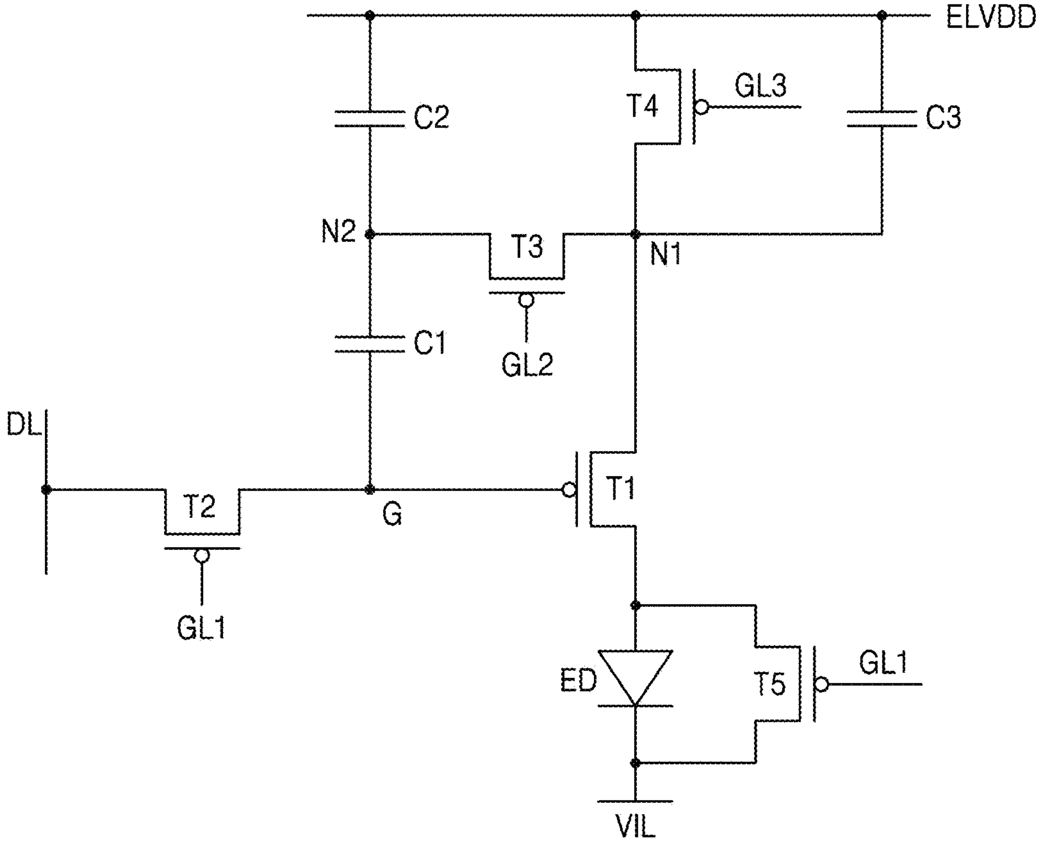
FIG. 7 is an equivalent circuit diagram of a pixel included in a display apparatus, according to an embodiment.

FIG. 7 is an equivalent circuit diagram of a pixel included in a display apparatus, according to an embodiment.

The pixel circuit of the pixel illustrated in FIG. 7 is an embodiment in which the third capacitor C3 is added to the pixel circuit of the pixel illustrated in FIG. 2. The third capacitor C3 may be connected between the driving voltage line ELVDD and the third transistor T3. A first electrode of the third capacitor C3 may be connected to the driving voltage line ELVDD, and a second electrode thereof may be connected to the second first node N1. The capacitance of the first capacitor C1 may be greater than a capacitance of the third capacitor C3.

In an embodiment, according to the pixel circuit of the pixel illustrated in FIG. 7, the voltages of the first node N1 and the second node N2 in the second period P2 and the third period P3 may be adjusted and the range of the data voltage Vdata may be adjusted. For example, the voltage of the second node N2 in the second period P2 may be a voltage Vref−Vth+β×(Vdata−Vref) and may be changed according to the capacity ratio between the first capacitor C1, the second capacitor C2, and the third capacitor C3 (β=C1/(C1+C2+C3)), and the voltage Vg of the third node G in the third period P3 may be expressed as "Vg=Vdata+VDD−Vref+Vth−[{C1/(C1+C2+C3)}×Vdata+ {C1/(C1+C2+C3)}×Vref])".

Figure 8:
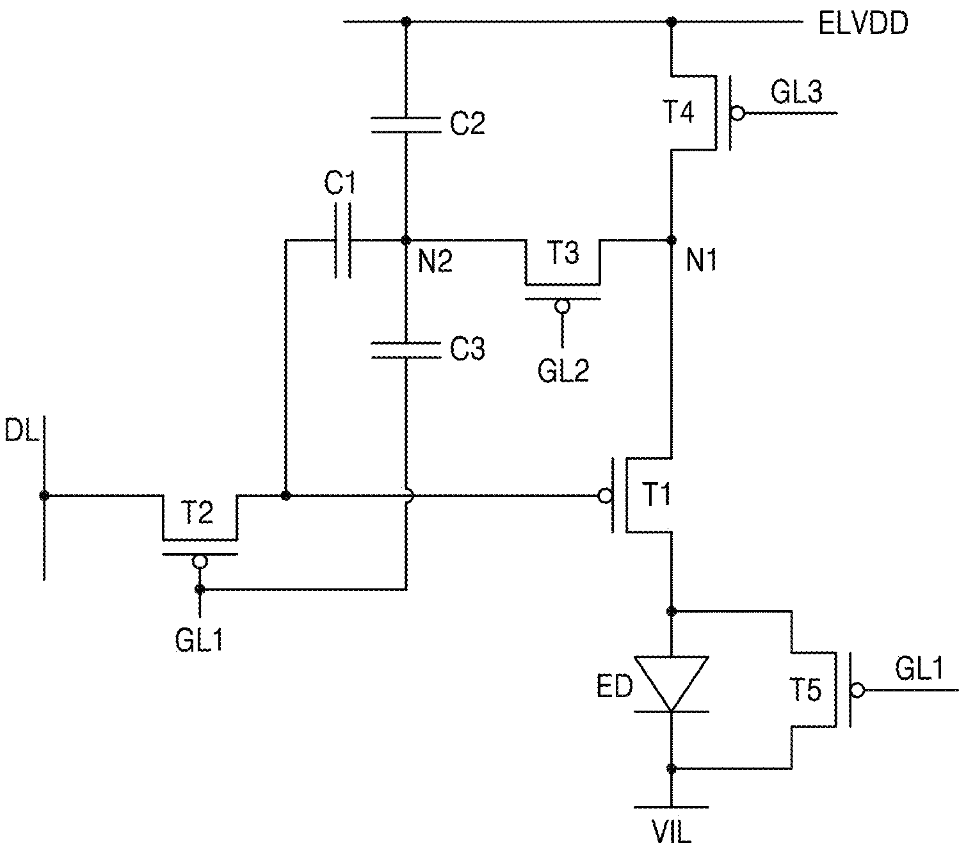
FIG. 8 is an equivalent circuit diagram of a pixel included in a display apparatus, according to an embodiment.

FIG. 8 is an equivalent circuit diagram of a pixel included in a display apparatus, according to an embodiment.

The pixel circuit of the pixel illustrated in FIG. 8 is an embodiment in which the third capacitor C3 is added to the pixel circuit of the pixel illustrated in FIG. 2. The third capacitor C3 in FIG. 8 may be connected between a gate of the second transistor T2 and the second node N2. The first electrode of the third capacitor C3 may be connected to the first gate line GL1 to which the gate of the second transistor T2 is connected, and the second electrode thereof may be connected to the second terminal of the third transistor T3, the first capacitor C1, and the second capacitor C2. The capacitance of the first capacitor C1 may be greater than the capacitance of the second capacitor C2, and the capacitance of the second capacitor C2 may be greater than the capacitance of the third capacitor C3.

In an embodiment, the third capacitor C3 illustrated in FIG. 8 may also be expressed as a fourth capacitor C4 to distinguish the same from the third capacitor C3 that is illustrated in FIG. 7.

In an embodiment, in a frame period in which the pixel circuit of the pixel illustrated in FIG. 8 operates, a fourth period P4 may be added to the non-emission period illustrated in FIG. 3. The fourth period P4 may be located between the second period P2 and the third period P3.

Figure 9A:
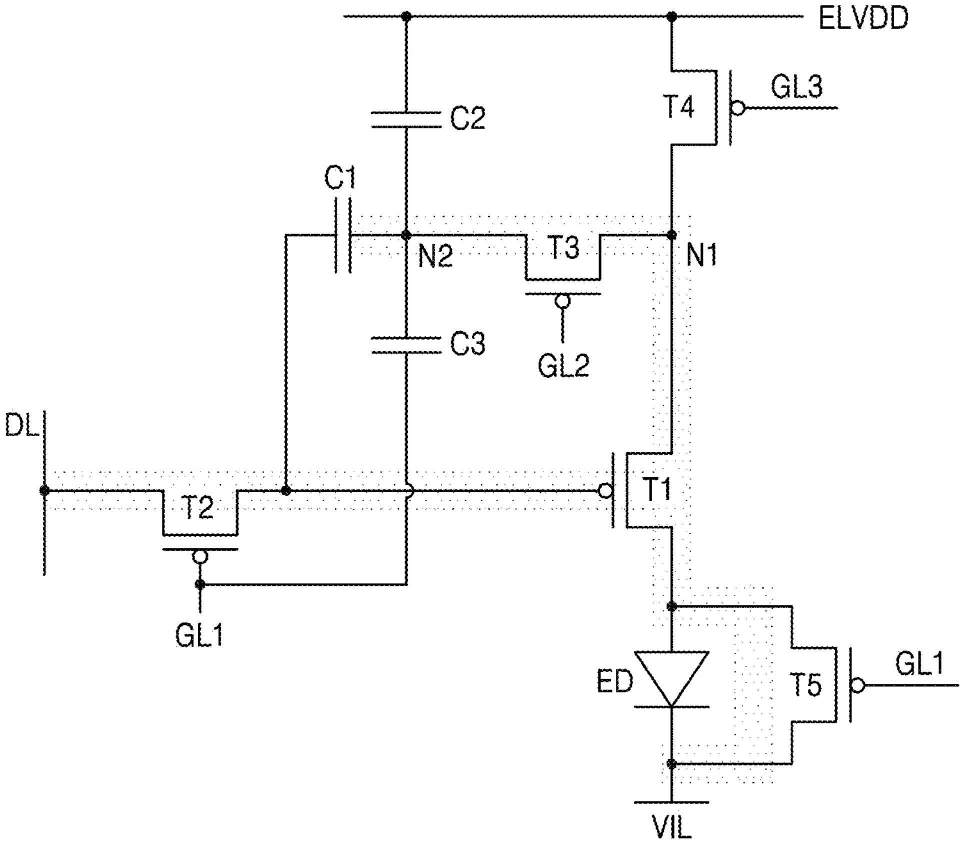
FIG. 9A is a circuit diagram for describing driving in a first period of the circuit illustrated in FIG. 8, according to an embodiment.
Figure 9B:
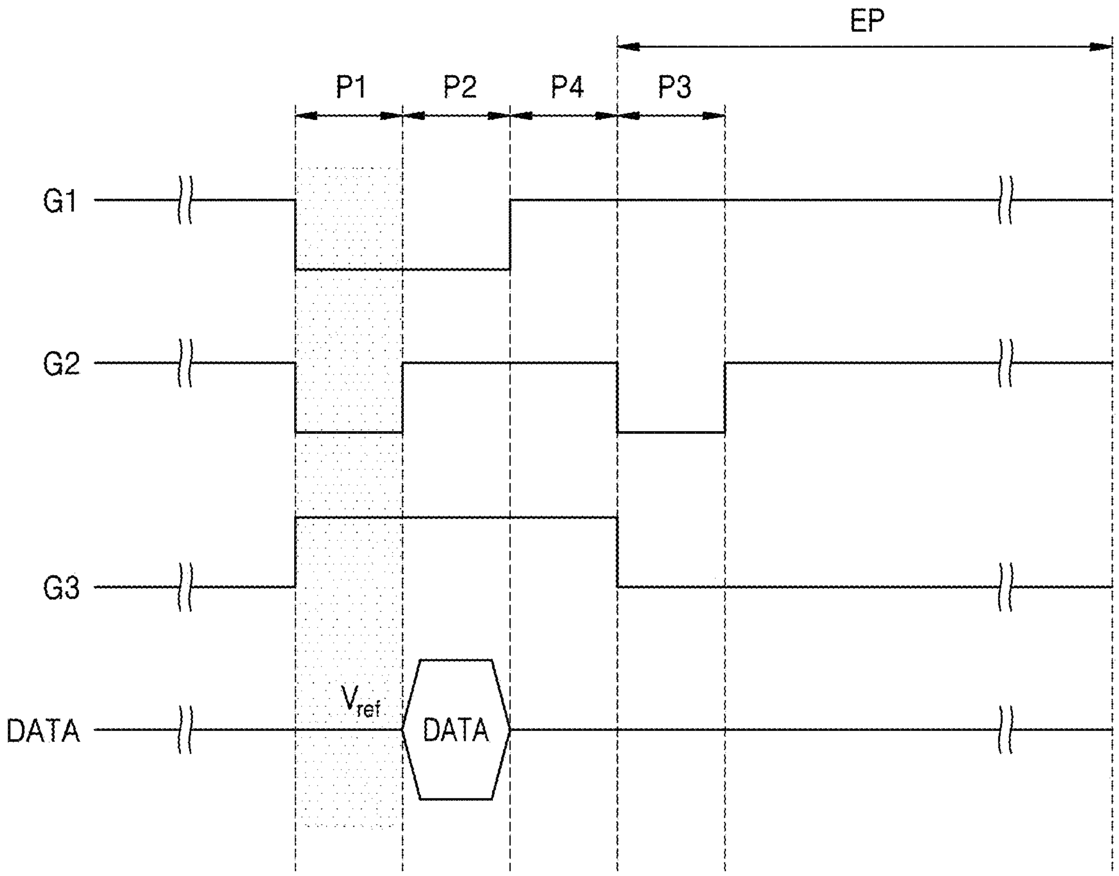
FIG. 9B is a timing diagram for describing driving in a first period of the circuit illustrated in FIG. 8, according to an embodiment.

FIGS. 9A and 9B are diagrams for describing driving in a first period of a circuit illustrated in FIG. 8, according to an embodiment.

In an embodiment, the first period P1 may be an initialization period in which the gate of the first transistor T1 and the pixel electrode of the light-emitting diode ED are initialized and a compensation period in which a threshold voltage of the first transistor T1 is compensated for. The first period P1 may be approximately one horizontal period 1H.

In an embodiment and referring to FIGS. 9A and 9B, in the first period P1, the first gate signal G1 of a gate-on voltage may be supplied to the first gate line GL1, and the second gate signal G2 of a gate-on voltage may be supplied to the second gate line GL2. The third gate signal G3 of a gate-off voltage may be supplied to the third gate line GL3. A reference voltage Vref may be supplied to the data line DL.

In an embodiment, the second transistor T2 and the fifth transistor T5 may be turned on by the first gate signal G1, and the third transistor T3 may be turned on by the second gate signal G2. The third node G, that is, the gate of the first transistor T1, may be initialized to the reference voltage Vref by the second transistor T2 that is turned on. The first node N1, that is, the pixel electrode of the light-emitting diode ED, may be initialized to the initialization voltage by the third transistor T3 that is turned on. In the first period P1, the voltage of the third node G is Vref, the voltage of the second node N2 is (Vref-Vth), and a voltage corresponding to the threshold voltage Vth of the first transistor T1 may be charged in the first capacitor C1.

Figure 10A:
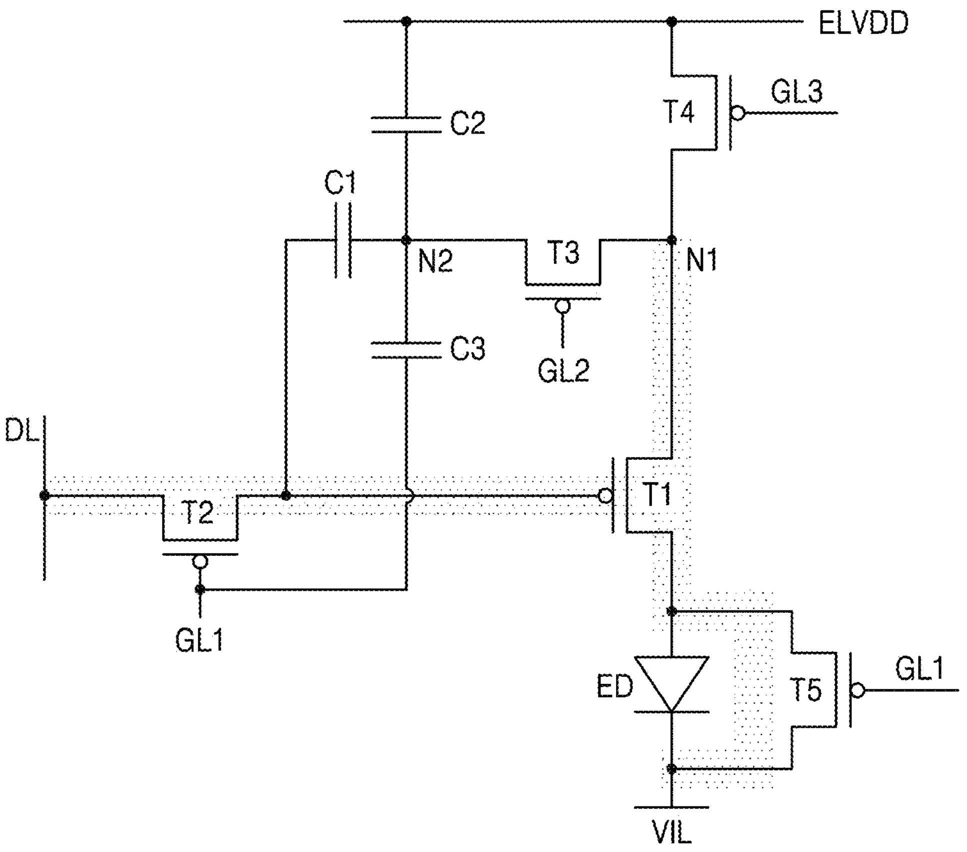
FIG. 10A is a circuit diagram for describing driving in a second period of the circuit illustrated in FIG. 8, according to an embodiment.
Figure 10B:
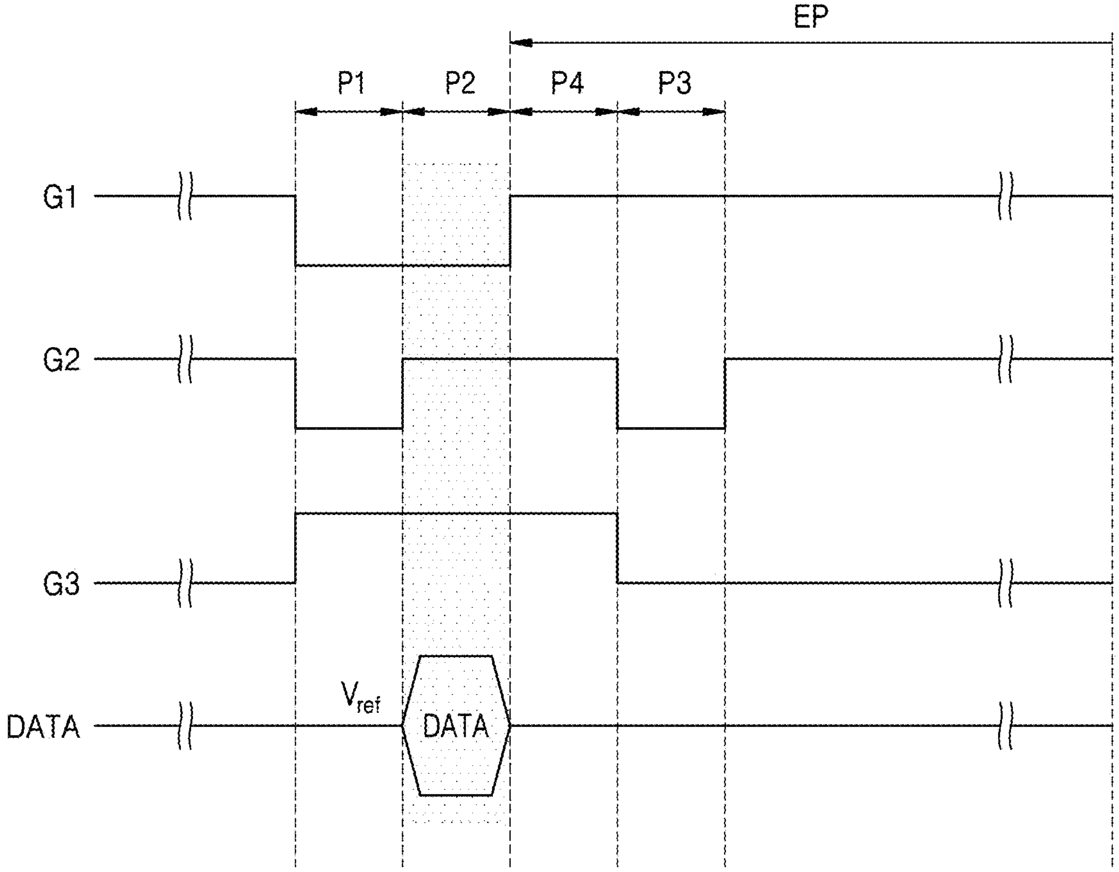
FIG. 10B is a timing diagram for describing driving in a second period of the circuit illustrated in FIG. 8, according to an embodiment.

FIGS. 10A and 10B are diagrams for describing driving in a second period of the circuit illustrated in FIG. 8, according to an embodiment.

In an embodiment, the second period P2 may be a write period in which the data signal DATA is transmitted to the gate of the first transistor T1. The second period P2 may be approximately one horizontal period 1H.

In an embodiment and referring to FIGS. 10A and 10B, in the second period P2, the first gate signal G1 of a gate-on voltage may be supplied to the first gate line GL1 to turn on the second transistor T2 and the fifth transistor T5. Here, the third transistor T3 and the fourth transistor T4 may be turned off by the second gate signal G2 and the third gate signal G3, which are of a gate-off voltage. The second transistor T2 may be configured to transmit the data voltage Vdata corresponding to the data signal DATA from the data line DL to the third node G, that is, the gate of the first transistor T1. Accordingly, the voltage of the third node G may be changed from the reference voltage Vref to the data voltage Vdata. Here, the voltage Vn2 of the second node N2 may also be changed in response to a voltage change (Vdata−Vref) of the third node G. The voltage Vn2 of the second node N2 may be a voltage (Vref−Vth+α×(Vdata−Vref)) that is changed according to the capacity ratio (α=C1/(C1+C2+C3)) between the first capacitor C1, the second capacitor C2, and the third capacitor C3. Accordingly, the voltage Vn2 of the second node N2 in the second period P2 is as shown in Equation (5) below, and the data voltage Vdata corresponding to the data signal DATA of the first transistor T1 may be charged in the first capacitor C1.

$$Vn2(P2) = Vref - Vth + \alpha \times (Vdata - Vref) = Vref - Vth + \{C1/(C1 + C2 + C3)\} \times (Vdata - Vref). \qquad \text{Eq. (5)}$$

Figure 11A:
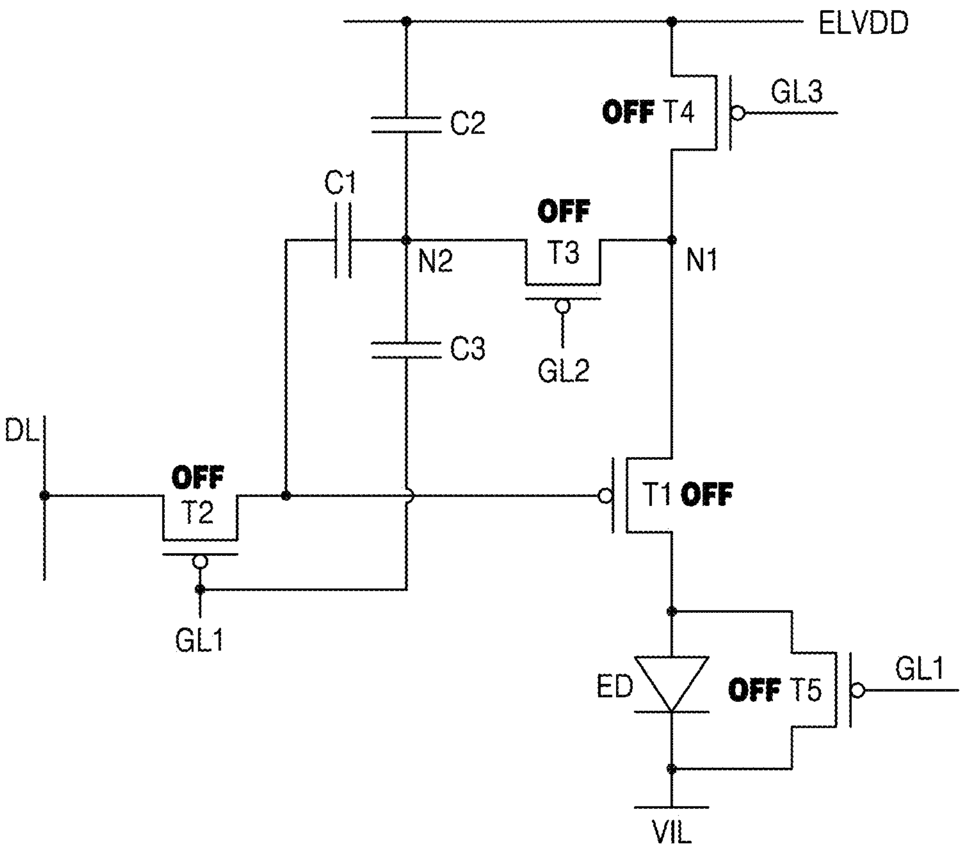
FIG. 11A is a circuit diagram for describing driving in a fourth period of the circuit illustrated in FIG. 8, according to an embodiment.
Figure 11B:
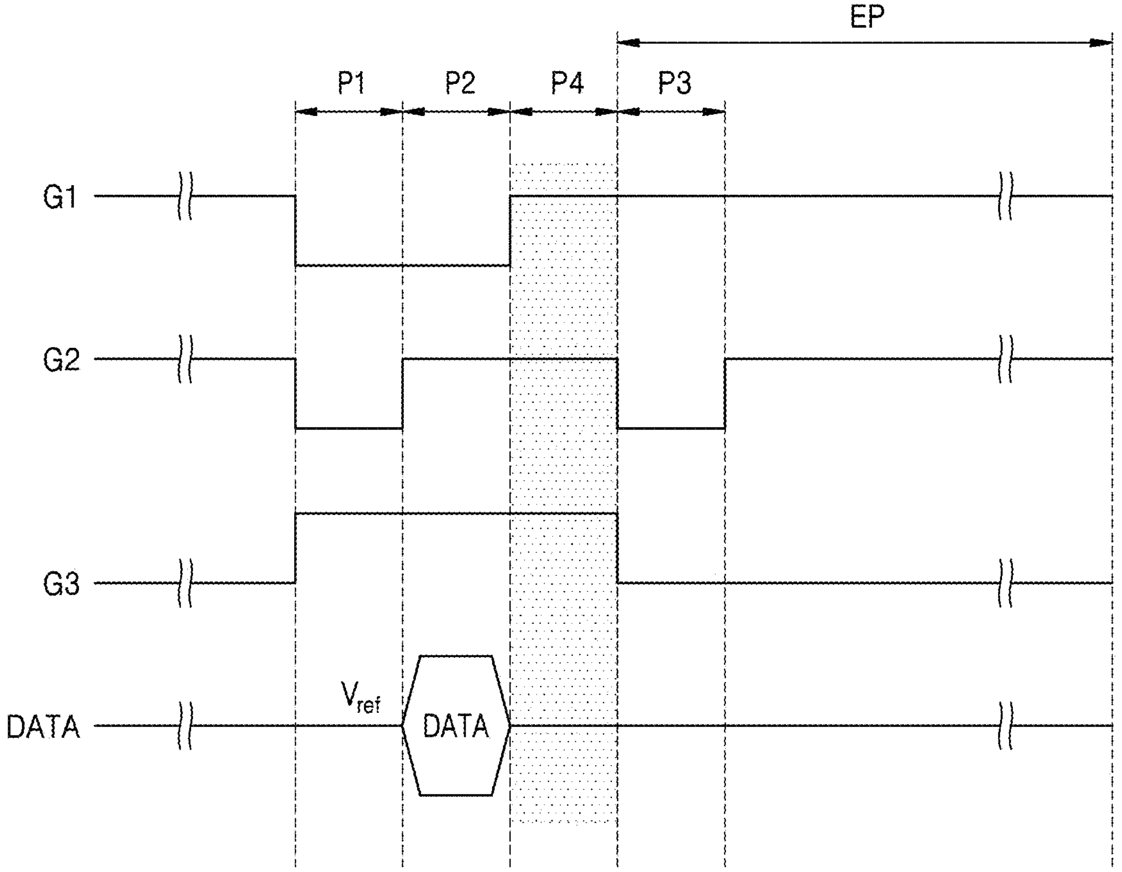
FIG. 11B is a timing diagram for describing driving in a fourth period of the circuit illustrated in FIG. 8, according to an embodiment.

FIGS. 11A and 11B are diagrams for describing driving in a fourth period of the circuit illustrated in FIG. 8, according to an embodiment.

In an embodiment and referring to FIGS. 11A and 11B, in the fourth period P4, the first gate signal G1 of a gate-off voltage may be supplied to the first gate line GL1, and the second gate signal G2 of a gate-off voltage may be supplied to the second gate line GL2, and a third gate signal G3 of a gate-off voltage may be supplied to the third gate line GL3.

In an embodiment, the first transistor to the fifth transistor T1, T2, T3, T4, T5, respectively, may be turned off by the first gate signal G1, the second gate signal G2, and the third gate signal G3, which are of a gate-off voltage. As the first gate signal G1 transitions from a gate-on voltage G1_Vgh to a gate-off voltage G1_Vgl, a voltage of the first electrode of the third capacitor C3 connected to the first gate line GL1 may be changed by a voltage change (G1_Vgh−G1_Vgl) of the first gate signal G1, and the voltage Vn2 of the second node N2 to which the second electrode of the third capacitor C3 is connected may be changed by the voltage change of the first gate signal G1.

In this embodiment, a voltage of the gate of the first transistor T1 in the fourth period P4 may be the data voltage Vdata, and the voltage Vn2 of the second node N2 may be expressed as Equation (6) below.

$$Vn2(P4) = Vn2(P2) + (\text{a change in the voltage } Vn2 \text{ of the second node } N2 \text{ between the second period } P2 \text{ and the fourth period } P4);$$

$$Vn2(P4) = Vref - Vth + \{C1/(C1 + C2 + C3)\} \times (Vdata - Vref) + \{C3/(C1 + C2 + C3)\} \times (\text{G1\_Vgh} - \text{G1\_Vgl}). \qquad \text{Eq. (6)}$$

Figure 12A:
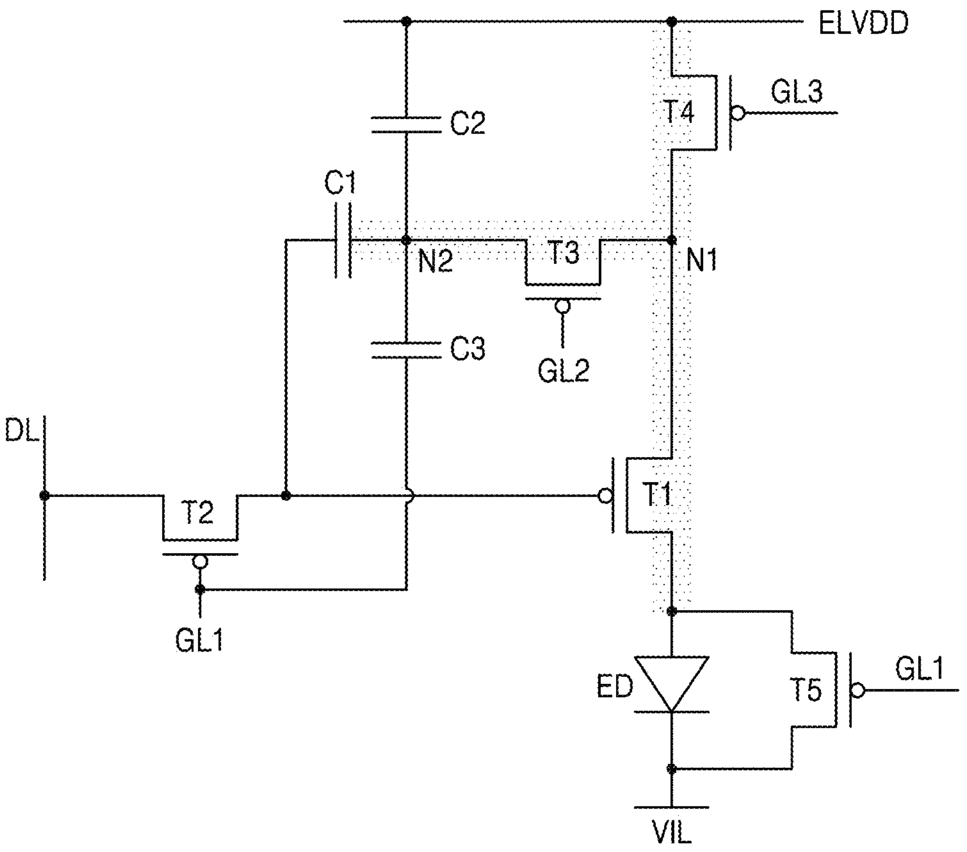
FIG. 12A is a circuit diagram for describing driving in a third period of the circuit illustrated in FIG. 8, according to an embodiment.
Figure 12B:
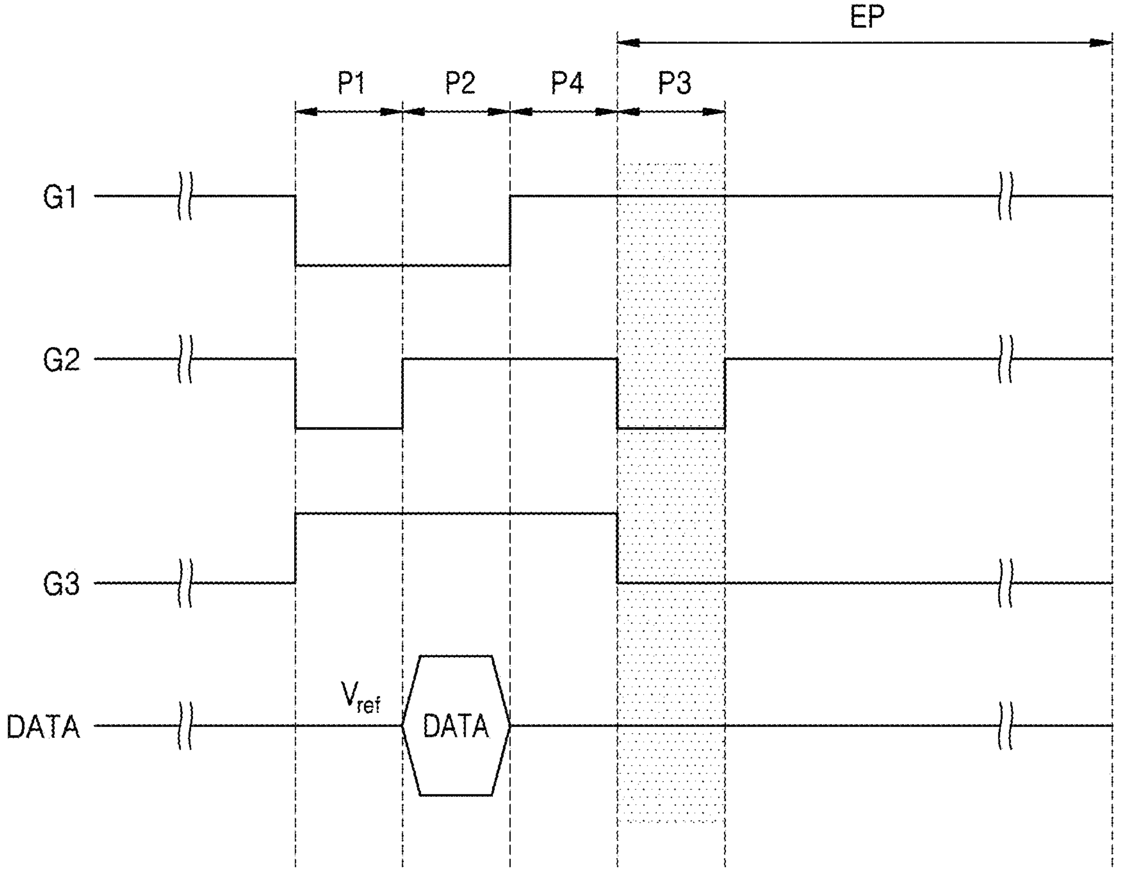
FIG. 12B is a timing diagram for describing driving in a third period of the circuit illustrated in FIG. 8, according to an embodiment.

FIGS. 12A and 12B are diagrams for describing driving in a third period of the circuit illustrated in FIG. 8, according to an embodiment.

In an embodiment and referring to FIGS. 12A and 12B, in the third period P3, the second gate signal G2 of a gate-on voltage may be supplied to the second gate line GL2, and the third gate signal G3 of a gate-on voltage may be supplied to the third gate line GL3. The first gate signal G1 of a gate-off voltage may be supplied to the third gate line GL3.

In an embodiment, the second transistor T2 and the fifth transistor T5 may be turned off by the first gate signal G1. The third transistor T3 and the fourth transistor T4 may be turned on by the second gate signal G2 and the third gate signal G3. Accordingly, the first driving voltage VDD may be supplied to the first terminal of the first transistor T1 to turn on the first transistor T1. As the third transistor T3 and the fourth transistor T4 are turned on, the voltage Vn2 of the second node N2 may be changed to the first driving voltage VDD in the third period P3. The voltage Vg of the third node G may be expressed as Equation (7) below.

$$Vg = Vg(P4) + Vn2(P3) - Vn2(P4);$$

$$Vg = Vdata + VDD - \text{Equation (6)}$$

$$Vg = Vdata + VDD - Vref + Vth - \{C1/(C1+C2+C3)\} * (Vdata - Vref) - \{C3/(C1+C2+C3)\} * (\text{G1\_Vgh} - \text{G1\_Vgl}). \quad \text{Eq. (7)}$$

In an embodiment, by the pixel illustrated in FIG. 8, in the gate voltage of the first transistor T1, both the data voltage Vdata and the voltage generated by the first gate signal G1 may be reflected together, thereby increasing the range of the data voltage. For example, a data voltage generated by the pixel illustrated in FIG. 8 may be increased by approximately 3 V compared to a data voltage generated by the pixel illustrated in FIG. 2.

Figure 13:
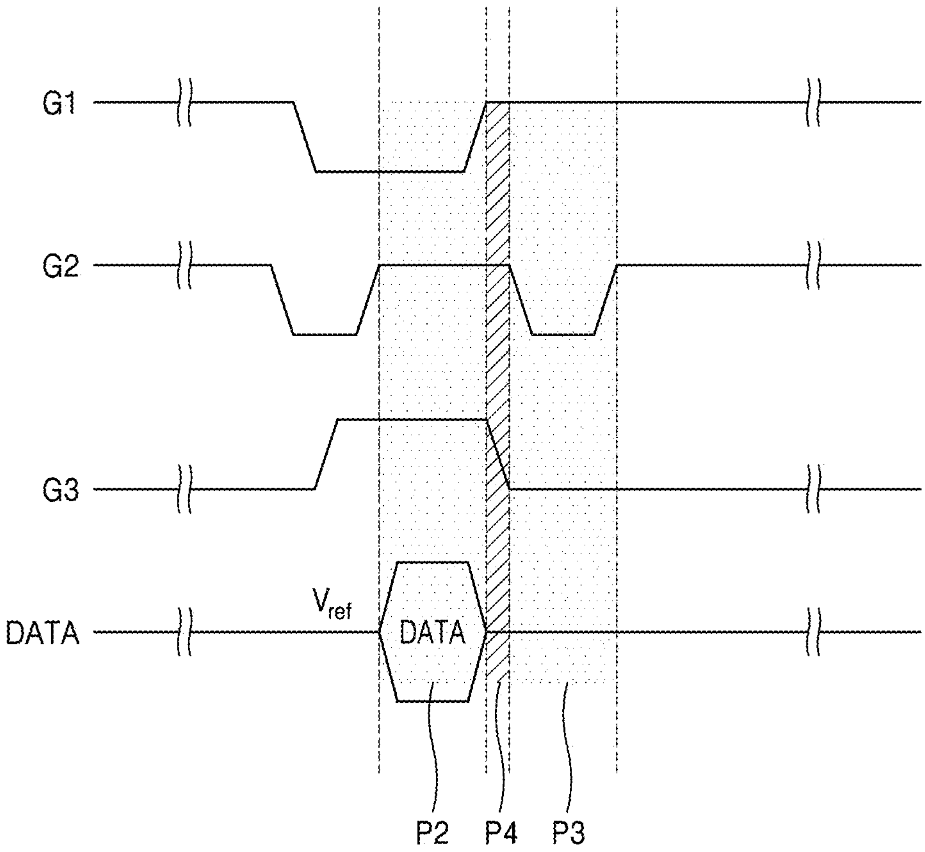
FIG. 13 is a timing diagram illustrating a case where a driving signal illustrated in FIG. 3 has a skew rate, according to an embodiment.

FIG. 13 is a timing diagram illustrating a gate signal, according to an embodiment.

In an embodiment and referring to FIG. 13, the first gate signal G1, the second gate signal G2, and the third gate signal G3 supplied by the gate driving circuit 12 may each be a signal having a rising edge and a falling edge that gradually changes. The first gate signal G1, the second gate signal G2, and the third gate signal G3 may have a gradually rising edge and a gradually falling edge.

In an embodiment, the gate driving circuit 12 may adjust a period during which a gate-on voltage is maintained, by adjusting the rising slope and falling slope of the first gate signal G1, the second gate signal G2, and the third gate signal G3. By finely controlling the first gate signal G1, the second gate signal G2, and the third gate signal G3, the on-off time of the transistor may be more finely controlled. For example, as illustrated in FIG. 13, the rising slope and falling slope of the first gate signal G1, the second gate signal G2, and the third gate signal G3 may be controlled to realize the fourth period P4. In this case, the fourth period P4 may be shorter than the first period P1, the second period P2, and the third period P3. For example, the fourth period P4 may be shorter than approximately one horizontal period 1H. In the fourth period P4, a timing at which the first gate signal G1 transitions from a gate-off voltage to a gate-on voltage may be earlier than a timing at which the second gate signal G2 transitions from a gate-on voltage to a gate-off voltage.

Figure 14:
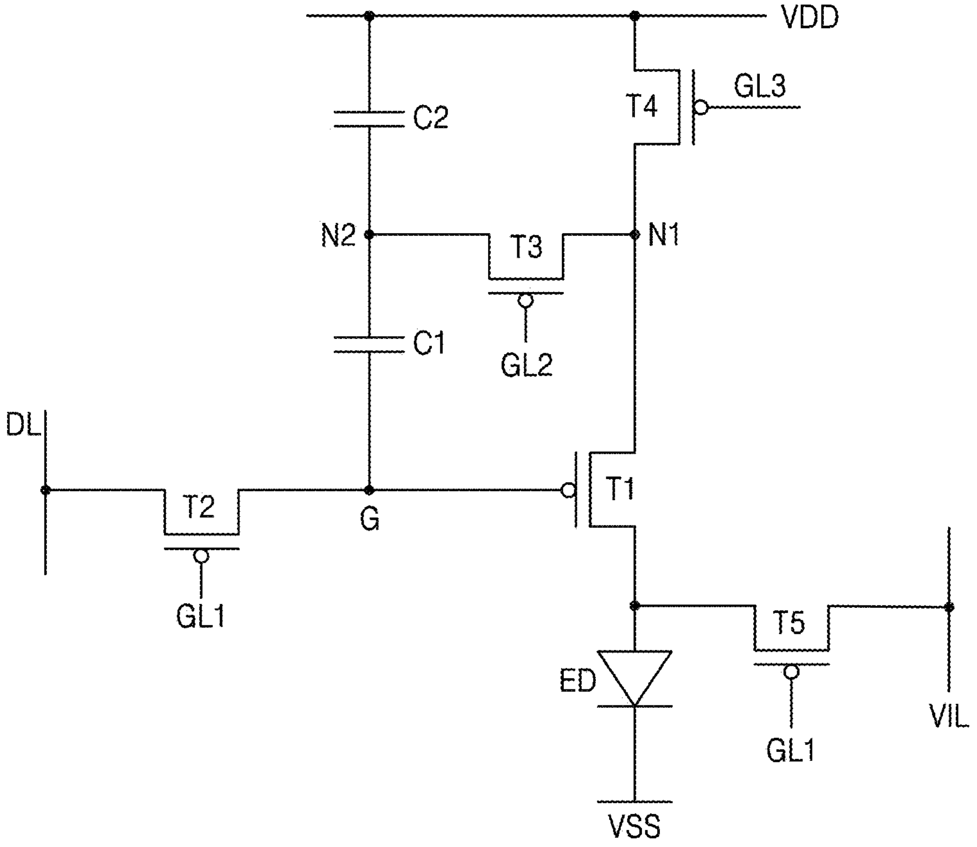
FIG. 14 is an equivalent circuit diagram of a pixel included in a display apparatus, according to an embodiment.

FIG. 14 is an equivalent circuit diagram of a pixel included in a display apparatus, according to an embodiment.

In an embodiment, a pixel circuit of the pixel illustrated in FIG. 14 is different from the pixel circuit of the pixel illustrated in FIG. 2 in that the initialization voltage line VIL to which the fifth transistor T5 is connected receives an initialization voltage Vint that is separate from the second driving voltage VSS. The fifth transistor T5 may include a first terminal connected to the second terminal of the first transistor T1, a second terminal connected to the initialization voltage line VIL to which the initialization voltage Vint is supplied, and a gate connected to the first gate line GL1. The initialization voltage Vint supplied to the initialization voltage line VIL may be lower than the second driving voltage VSS.

In an embodiment, as the initialization voltage is supplied from the fifth transistor T5, the light-emitting diode ED may be discharged, and the pixel electrode of the light-emitting diode ED may be initialized to the initialization voltage Vint.

Figure 15:
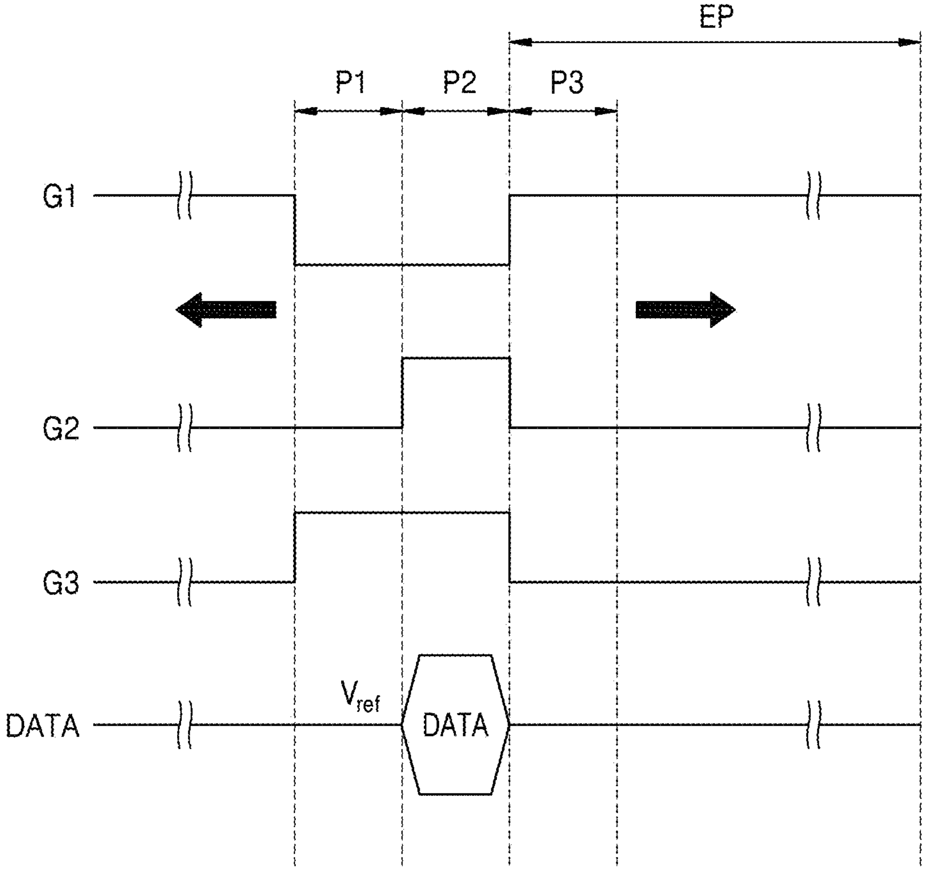
FIG. 15 is a timing diagram illustrating a driving signal of a pixel circuit according to an embodiment.

FIG. 15 is a timing diagram illustrating signals for driving a pixel circuit, according to an embodiment.

In an embodiment and referring to FIG. 15, even when the second gate signal G2 is supplied with a gate-off voltage before the first period P1 and after the third period P3, the pixel circuit of the illustrated pixel may be driven. Although not shown, the pixel circuit of the pixel illustrated in FIG. 8 to which the third capacitor C3 is added may also be driven in the manner described with reference to FIGS. 9 to 12, even when the second gate signal G2 is supplied with a gate-off voltage before the first period P1 and after the second period P3.

In an embodiment, the operations of the method or algorithm described in connection with embodiments of the invention may be implemented directly in hardware, implemented as a software module executed by hardware, or a combination thereof. The software module may be random access memory (RAM), read only memory (ROM), erasable programmable ROM (EPROM), electrically erasable programmable ROM (EEPROM), flash memory, hard disk, removable disk, CD-ROM, or may reside on any type of computer-readable recording medium well known in the art to which the disclosure pertains.

Above, the embodiments of the invention have been described with reference to the attached drawings, but those skilled in the art will understand that the invention may be implemented in other specific forms without changing its technical idea or essential features. Therefore, the embodiments of the invention described above should be understood in all respects as illustrative and not restrictive.

According to an embodiment, a display apparatus with improved image quality may be provided by compensating the threshold voltage of a driving transistor constituting a pixel circuit.

According to an embodiment, the circuit driving speed can be increased and a display panel can be displayed at high resolution by appropriately configuring the number of transistors and capacitors in a pixel circuit.

The effects of the embodiments are not limited to the effects described above, and other effects not mentioned herein may be clearly understood by those skilled in the art from the description below.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the invention. Moreover, the embodiments or parts of the embodiments may be combined in whole or in part without departing from the scope of the invention.

What is claimed is:

1. A pixel comprising:

a first transistor configured to output a driving current corresponding to an amplitude of a data voltage;

a second transistor connected between a gate of the first transistor and a data line;

a third transistor connected between the first transistor and the second transistor;

a fourth transistor connected between the first transistor and a driving voltage line;

a light-emitting diode connected to the first transistor;

a first capacitor connected between the gate of the first transistor, and the third transistor; and a second capacitor connected between the third transistor and the driving voltage line;

wherein the pixel is configured to operate in a non-emission period and an emission period during a frame period, and wherein, in the emission period, the second transistor and the third transistor are turned off, and the fourth transistor is turned on.

2. The pixel of claim 1, further comprising a fifth transistor connected to a first electrode of the light-emitting diode and an initialization voltage line.

3. The pixel of claim 2, wherein the non-emission period comprises:

a write period in which the third transistor, the fourth transistor, and the fifth transistor are turned off and the second transistor is turned on, wherein a data signal is applied from the data line to the gate of the first transistor; and before the write period, a first period in which the second transistor, the third transistor, and the fifth transistor are turned on and the fourth transistor is turned off, wherein an initialization voltage is applied from the data line to the gate of the first transistor.

4. The pixel of claim 3, wherein, in the emission period, the fifth transistor are turned off.

5. The pixel of claim 4, wherein the emission period comprises, after the write period, a second period in which the third transistor is turned on.

6. The pixel of claim 2, further comprising a fourth capacitor connected between a gate of the second transistor and a second node, wherein the second node comprises a node to which the first capacitor and the second capacitor are connected.

7. The pixel of claim 6, wherein the non-emission period comprises:

a write period in which the third transistor, the fourth transistor, and the fifth transistor are turned off and the second transistor is turned on, wherein a data signal is applied from the data line to the gate of the first transistor; and before the write period, a first period in which the second transistor, the third transistor, and the fifth transistor are turned on and the fourth transistor is turned off, wherein an initialization voltage is applied from the data line to the gate of the first transistor, and wherein the emission period comprises, after the write period, a second period in which the third transistor is turned on, and wherein the non-emission period further comprises, after the write period and before the second period, a third period in which the second transistor, the third transistor, and the fourth transistor are turned off.

8. The pixel of claim 7, wherein, in the third period, a timing at which the first gate signal transitions from a gate-off voltage to a gate-on voltage is earlier than a timing at which the second gate signal transitions from a gate-on voltage to a gate-off voltage.

9. The pixel of claim 7, wherein the third period is shorter than the first period and the second period.

10. The pixel of claim 2, wherein a voltage supplied to the initialization voltage line is supplied to a second electrode of the light-emitting diode.

11. The pixel of claim 2, wherein a voltage supplied to the initialization voltage line is different from the voltage supplied to the second electrode of the light-emitting diode.

12. A pixel comprising:

a first transistor configured to output a driving current corresponding to an amplitude of a data voltage;

a second transistor connected between a gate of the first transistor and a data line;

a third transistor connected between the first transistor and the second transistor;

a fourth transistor connected between the first transistor and a driving voltage line;

a light-emitting diode connected to the first transistor;

a first capacitor connected between the gate of the first transistor, and the third transistor;

a second capacitor connected between the third transistor and the driving voltage line;

a third capacitor connected between the driving voltage line and a first node, wherein the first node comprises a node to which the first transistor and the third transistor are connected.

13. A display apparatus comprising:

a plurality of pixels;

a gate driving circuit configured to supply a gate signal to the plurality of pixels; and a data driving circuit configured to supply a data signal to the plurality of pixels, wherein each of the plurality of pixels comprises:

a first transistor configured to output a driving current corresponding to an amplitude of a data voltage;

a second transistor which includes a gate connected to a first gate line and which is connected between a gate of the first transistor and a data line;

a third transistor which includes a gate connected to a second gate line and which is connected between the first transistor and the second transistor;

a fourth transistor which includes a gate connected to a third gate line and which is connected between the first transistor and a driving voltage line;

a light-emitting diode connected to the first transistor;

a first capacitor connected between the gate of the first transistor and the third transistor;

a second capacitor connected between the third transistor and the driving voltage line wherein, in a emission period of a frame period, the second transistor and the third transistor are turned off, and the fourth transistor is turned on.

14. The display apparatus of claim 13, wherein each of the plurality of pixels further comprises a fifth transistor which includes a gate connected to the first gate line and which is connected between a first electrode of the light-emitting diode and an initialization voltage line.

15. The display apparatus of claim 14, wherein, in a first period of the frame period, the gate driving circuit is configured to supply, to the first gate line, a first gate signal that turns on the second transistor and the fifth transistor, and to supply, to the second gate line, a second gate signal that turns on the third transistor and in a write period of the frame period, the gate driving circuit is configured to supply, to the first gate line, the first gate signal that turns on the second transistor, and the data driving circuit is configured to supply an initialization voltage to the data line in the first period, and to supply a data signal to the data line in the write period.

16. The display apparatus of claim 14, wherein the emission period comprises, after the write period, a second period in which the third transistor is turned on, wherein the gate driving circuit is configured to supply, to the second gate line, a second gate signal that turns on the third transistor in the second period.

17. The display apparatus of claim 16, wherein each of the plurality of pixels further comprises a third capacitor connected between the driving voltage line and the first node, wherein the first node comprises a node to which the first transistor and the third transistor are connected.

18. The display apparatus of claim 16, wherein each of the plurality of pixels further comprises a fourth capacitor connected between the first gate line and a second node, wherein the second node comprises a node to which the first capacitor and the second capacitor are connected.

19. The display apparatus of claim 18, wherein the frame period further comprises, after the write period and before the second period, a third period in which the second transistor, the third transistor, and the fourth transistor are turned off.

* * * * *